(12) United States Patent
Yamada et al.

(10) Patent No.: US 9,352,654 B2
(45) Date of Patent: May 31, 2016

(54) IMPACT MITIGATING STRUCTURE OF CONTACT STRIP PIECE

(75) Inventors: Haruo Yamada, Tokyo (JP); Takeshi Kurita, Tokyo (JP); Fumio Mizushima, Tokyo (JP); Shinji Nakajima, Sagamihara (JP); Hitoshi Satoh, Yokohama (JP)

(73) Assignees: East Japan Railway Company, Tokyo (JP); Toyo Electric Mfg. Co., Ltd., Tokyo (JP)

( * ) Notice: Subject to any disclaimer, the term of this patent is extended or adjusted under 35 U.S.C. 154(b) by 248 days.

(21) Appl. No.: 13/876,845

(22) PCT Filed: Sep. 30, 2011

(86) PCT No.: PCT/JP2011/072574
§ 371 (c)(1),
(2), (4) Date: Jun. 4, 2013

(87) PCT Pub. No.: WO2012/043798
PCT Pub. Date: Apr. 5, 2012

(65) Prior Publication Data
US 2013/0270050 A1 Oct. 17, 2013

(30) Foreign Application Priority Data
Sep. 30, 2010 (JP) .................................. 2010-222212

(51) Int. Cl.
*B60L 5/20* (2006.01)
*B60L 5/30* (2006.01)

(52) U.S. Cl.
CPC ... *B60L 5/20* (2013.01); *B60L 5/30* (2013.01); *B60L 2200/26* (2013.01)

(58) Field of Classification Search
CPC .................................. B60L 5/20; B60L 5/205
USPC .................................................. 191/59, 59.1
See application file for complete search history.

(56) References Cited

U.S. PATENT DOCUMENTS 4,155,435 A * 5/1979 Kimura et al. .................. 191/58
4,578,546 A * 3/1986 Ferguson ........................ 191/87
(Continued)

FOREIGN PATENT DOCUMENTS

CN 1078434 A 11/1993
CN 101166646 A 4/2008
(Continued)

OTHER PUBLICATIONS

International Search Report, PCT/JP2011/072574, dated Jan. 10, 2012.
(Continued)

*Primary Examiner* — Zachary Kuhfuss
(74) *Attorney, Agent, or Firm* — Nixon Peabody LLP; Khaled Shami

(57) ABSTRACT

A slider is slightly moved in a direction in which both side surfaces of the slider come in contact with inclined surfaces of impact mitigating parts of neighboring contact strip pieces. For this reason, the inclined surface of the impact mitigating part of the contact strip piece which the slider approaches is relatively downwardly slid with respect to one side surface of the slider. In addition, the inclined surface of the impact mitigating part of the contact strip piece from which the slider moves away is relatively upwardly slid with respect to the other side surface of the slider. As a result, since an impact generated between the contact strip piece and the slider is mitigated by the impact mitigating part without fitting the slider into a stepped section between the neighboring contact strip pieces, the slider is smoothly transferred from the one contact strip piece of the neighboring contact strip pieces to the other contact strip piece.

6 Claims, 21 Drawing Sheets

(56) References Cited

U.S. PATENT DOCUMENTS

| | | | |
|---|---|---|---|
| 5,176,230 A * | 1/1993 | Odot | 191/87 |
| 5,351,794 A * | 10/1994 | Deutzer | 191/55 |
| 8,727,085 B2 * | 5/2014 | Hiebenthal | 191/59.1 |
| 2009/0211861 A1 * | 8/2009 | Okimoto et al. | 191/59.1 |
| 2013/0256073 A1 * | 10/2013 | Yamada et al. | 191/60.2 |

FOREIGN PATENT DOCUMENTS

| | | | |
|---|---|---|---|
| EP | 0 195 616 A2 | 9/1986 | |
| JP | 62-018901 A | 1/1987 | |
| JP | 03-076082 B2 | 12/1991 | |
| JP | 2004-056911 A | 2/2004 | |
| JP | 2005-160266 | 6/2005 | |
| JP | 2006087213 A | 3/2006 | |
| JP | 2007-236119 A | 9/2007 | |

OTHER PUBLICATIONS

Chinese Office Action for Chinese Application No. 201180047066.0, mailed Dec. 24, 2014, 11 pages.

* cited by examiner

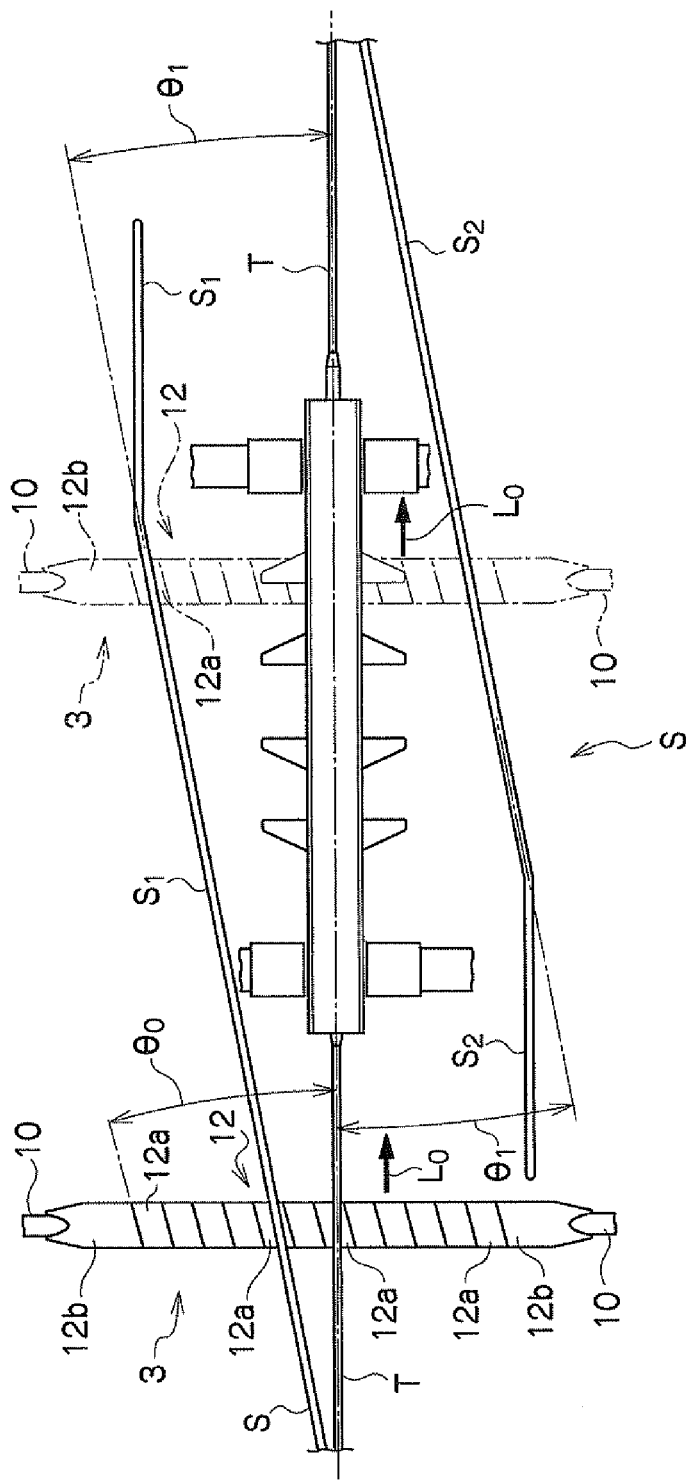

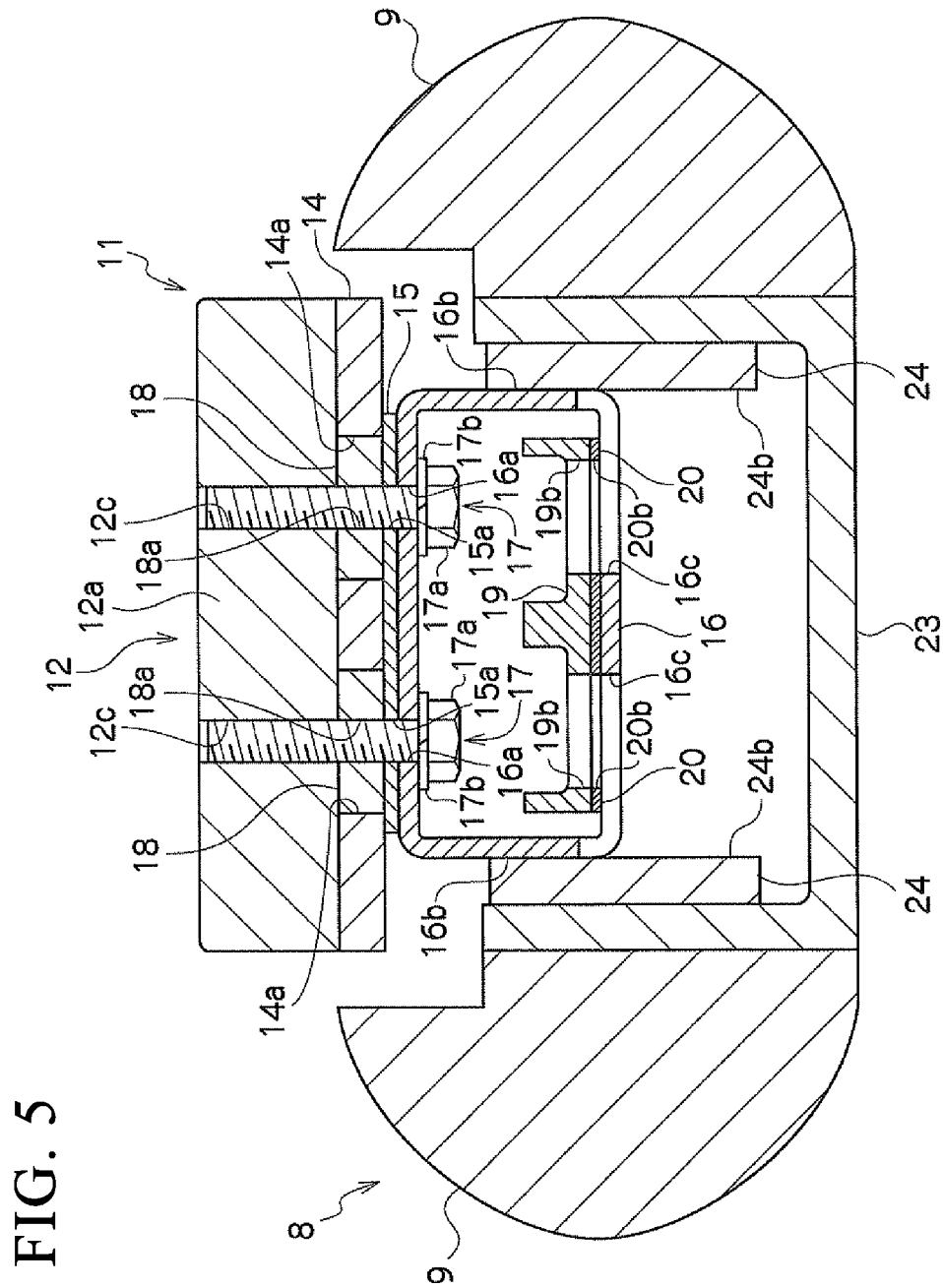

IMPACT MITIGATING STRUCTURE OF CONTACT STRIP PIECE

CROSS REFERENCE TO RELATED APPLICATIONS OR PRIORITY CLAIM

This application is a National Phase of PCT/JP2011/072574, filed Sep. 30, 2011, entitled, "IMPACT MITIGATING STRUCTURE OF CONTACT STRIP PIECE", which claims the benefit of Japanese Patent Application No. 2010-222212, filed Sep. 30, 2010, the contents of which are incorporated herein by reference in their entirety.

The present invention relates to an impact mitigating structure of a contact strip piece capable of mitigating an impact generated from the contact strip piece in which a contact strip sliding along an electric-car line is divided into a plurality of pieces and arranged in a longitudinal direction.

BACKGROUND ART

At the present time, traveling at 360 km/h on the Shinkansen (trademark) is being promoted. In this case, in a pantograph for the Shinkansen (trademark) of the related art type, current collection performance is insufficient. For this reason, a multi-segmentation contact strip body having only sufficient current collection performance in this speed range is likely to be employed. The multi-segmentation contact strip body of the related art includes a plurality of contact strip pieces slidably moving along a trolley wire of an overhead line, a flexible seat resiliently deformed according to movement of the plurality of contact strip pieces in an upward and downward direction, a copper plate electrically connected to the plurality of contact strip pieces, a plurality of movable guides integrated with the plurality of contact strip pieces and move in the upward and downward direction, a fixing guide part attached to a shoe body frame and configured to movably guide the movable guide, a stopper part configured to restrict movement of the movable guide part in the upward and downward direction, and a plurality of springs movably supporting the plurality of contact strip pieces in the upward and downward directions (for example, see Patent Document 1). In the multi-segmentation contact strip body of the related art, the contact strip is divided into the plurality of contact strip pieces in the longitudinal direction. For this reason, a weight of each of the contact strip pieces is reduced, and following performance to the trolley wire upon current collection is improved. As a result, separation of the contact strip piece from the trolley wire, i.e., a separation line, is reduced, and current collection performance is improved.

RELATED ART DOCUMENT

Patent Document

Patent Document 1 Japanese Unexamined Patent Application, First Publication No. 2005-160266

SUMMARY OF THE INVENTION

Problems to be Solved by the Invention

FIG. 15 is a plan view schematically showing a state when a contact strip of a current collecting apparatus of the related art passes through an alternating current in-phase section. FIGS. 16A and 16B are front views showing a state of a slider and the contact strip when the contact strip of the current collecting apparatus of the related art passes through the alternating current in-phase section, when seen from a rear side in a traveling direction of the contact strip.

A current collecting apparatus 103 of the related art shown in FIG. 15 includes a plurality of contact strip pieces 112a and 112b formed by dividing a contact strip 112 sliding with a trolley wire T of an overhead line L in a longitudinal direction. Both side sections of the contact strip pieces 112a and 112b are linearly cut at an inclination angle $\theta_0$ of about 15° with respect to a traveling direction (a direction perpendicular to the longitudinal direction of the contact strip 112) $L_0$ of the contact strip 112. For this reason, gaps are slightly formed between the neighboring contact strip pieces 112a and the neighboring contact strip pieces 112a and 112b. A sectioning point S is equipment for electrically sectioning an electric-car line. The sectioning point S includes sliders $S_1$ and $S_2$, and so on, configured to guide the contact strip 112 between the trolley wire T of an inlet side and the trolley wire T of an outlet side. The slider $S_1$ is formed to be spaced apart from the trolley wire T at an inclination angle $\theta_1$ of about 10.8° at a left side in a traveling direction with respect to the traveling direction $L_0$. The slider $S_2$ is formed to approach the trolley wire T at the inclination angle $\theta_1$ of about 10.8° from a right side in the traveling direction with respect to the traveling direction $L_0$.

As shown in FIG. 16A, when the contact strip 112 passes through the sectioning point S, a contact force C is applied to the contact strip piece 112a sliding with the slider $S_1$. For this reason, a spring configured to support the contact strip piece 112a is compressed. However, the contact force C is not applied to the neighboring contact strip pieces 112a, which do not slide with the slider $S_1$. For this reason, the spring configured to support the contact strip piece 112a is not compressed. As a result, a stepped section is formed between the neighboring contact strip pieces 112a. As shown in FIG. 15, the inclination angle $\theta_0$ of both side sections of the contact strip piece 112a and one side section of the contact strip piece 112b with respect to the traveling direction $L_0$ of the contact strip 112 is close to the inclination angle $\theta_1$ of the slider $S_1$ with respect to the traveling direction $L_0$ of the contact strip 112. For this reason, as shown in FIG. 16B, when the contact strip 112 passes through the sectioning point S, the slider $S_1$ is fitted into the stepped section formed at the gap between the neighboring contact strip pieces 112a and the neighboring contact strip pieces 112a and 112b. Then, the slider $S_1$ collides with the contact strip pieces 112a and 112b, and an impact force is generated between the contact strip pieces 112a and 112b and the slider $S_1$.

It is an aspect of the present invention to provide an impact mitigating structure of a contact strip piece capable of easily mitigating an impact generated when a contact strip piece collides with an electric-car line, through simple machining.

Means for Solving the Problems

The present invention solves the above-mentioned problem by solving means described below.

An impact mitigating structure of a contact strip piece according to a first aspect of the present invention is configured to mitigate an impact generated at a plurality of contact strip pieces formed by dividing a contact strip sliding with an electric-car line in a longitudinal direction. The impact mitigating structure of the contact strip piece according to the first aspect of the present invention includes an impact mitigating part configured to mitigate the impact generated when the contact strip piece collides with the electric-car line between the neighboring contact strip pieces.

In the impact mitigating structure of the contact strip piece according to a second aspect of the present invention, the impact mitigating part remains until the contact strip piece arrives at a predetermined abrasion loss.

In the impact mitigating structure of the contact strip piece according to a third aspect of the present invention, the impact mitigating part is formed at a corner of the contact strip piece.

In the impact mitigating structure of the contact strip piece according to a fourth aspect of the present invention, the impact mitigating part is a chamfered section formed at the corner of the contact strip piece.

In the impact mitigating structure of the contact strip piece according to a fifth aspect of the present invention, the impact mitigating part is a rounded section formed at the corner of the contact strip piece.

Effects of the Invention

According to the impact mitigating structure of the contact strip piece according to the present invention, an impact generated when the contact strip piece collides with the electric-car line can be easily mitigated through simple machining of the structure.

BRIEF DESCRIPTION OF THE DRAWINGS

FIG. 2 is a plan view schematically showing a state when the current collecting apparatus including the impact mitigating structure of the contact strip piece according to the first embodiment of the present invention passes through a sectioning point.

FIG. 5 is a cross-sectional view taken along line V-V of FIG. 3.

MODES FOR CARRYING OUT THE INVENTION

First Embodiment

Hereinafter, a first embodiment of the present invention will be described in detail with reference to the accompanying drawings.

Figure 1A:
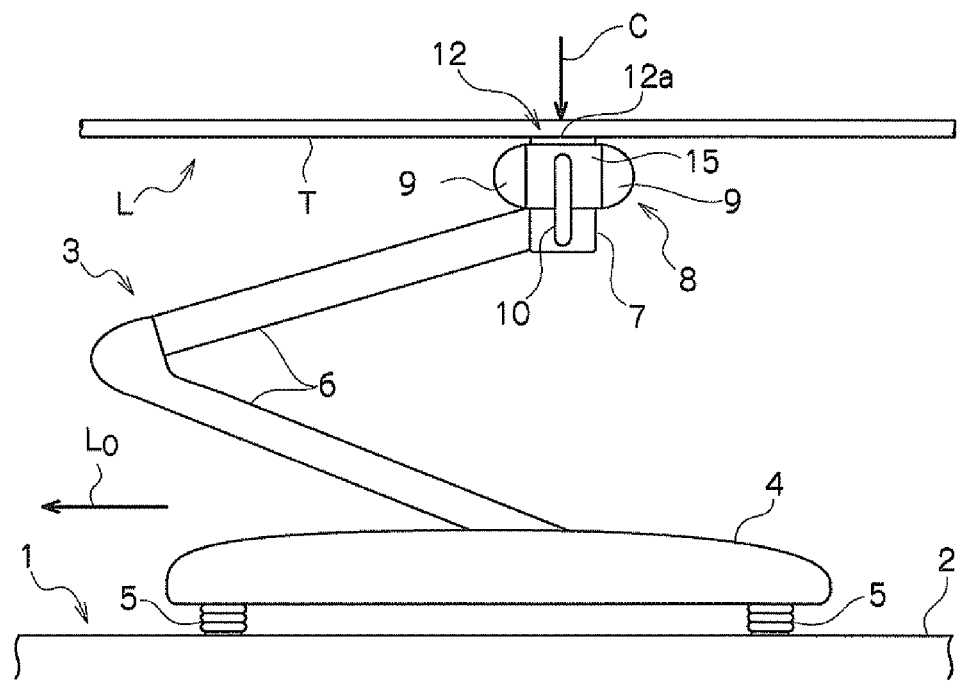
FIG. 1A is a schematic side view of a current collecting apparatus including an impact mitigating structure of a contact strip piece according to a first embodiment of the present invention.
Figure 1B:
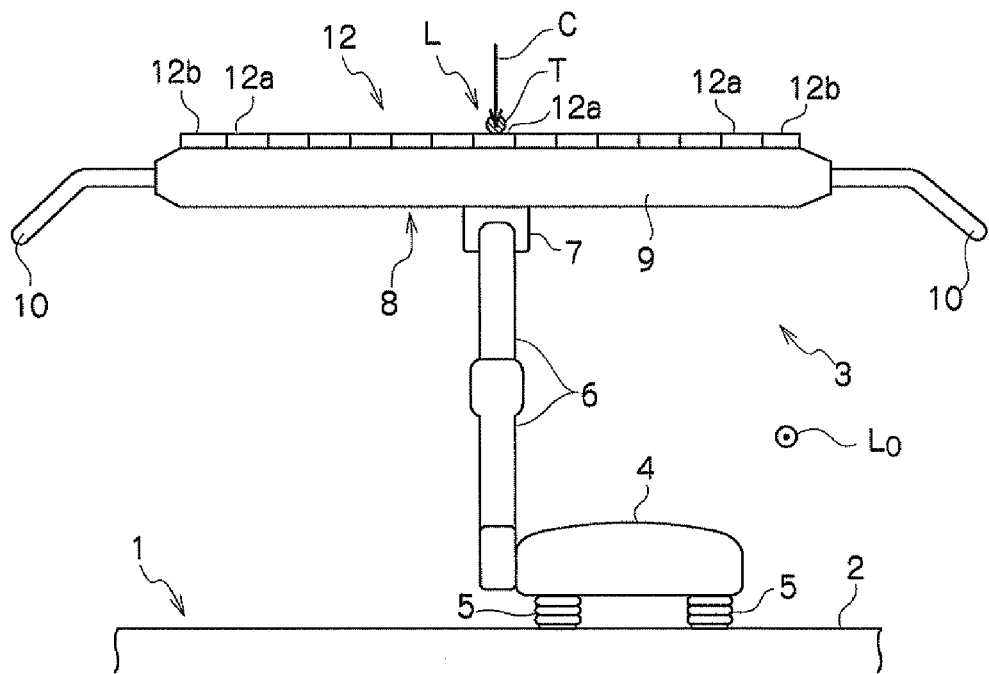
FIG. 1B is a schematic front view of the current collecting apparatus including the impact mitigating structure of the contact strip piece according to the first embodiment of the present invention.

An overhead line L shown in FIGS. 1A and 1B is an electric-car line installed over a railroad, and is supported by support points at predetermined intervals. A trolley wire T is an electric wire, with which a contact strip 12 of a current collecting apparatus 3 comes in contact, and a load current is supplied to a vehicle 1 as the contact strip 12 is moved while contacting the trolley wire T. The vehicle 1 is an electric car such as an electric train, an electric locomotive, or the like, for example, a railroad vehicle such as the Shinkansen (trademark), which travels at a high speed. A vehicle body 2 is a structure for loading and transporting passengers.

A sectioning point S shown in FIG. 2 is an apparatus for electrically suctioning an electric-car line. For example, the sectioning point S shown in FIG. 2 is an insulator type section (A type section) used when the overhead line L is electrically sectioned at a place in which phases of power sources are equal, in a station yard or the like of an alternating current electrification section. The sectioning point S includes sliders (section sliders) $S_1$ and $S_2$. The sliders $S_1$ and $S_2$ are electric-car lines configured to guide the contact strip 12 such that the contact strip 12 smoothly passes between the trolley wire T at which the contact strip 12 enters and the trolley wire T at which the contact strip 12 exits. The slider $S_1$ is disposed at a side in which the contact strip 12 enters, and the slider $S_2$ is disposed at a side from which the contact strip 12 exits. The slider $S_1$ is formed to be spaced apart from the trolley wire T at an inclination angle $\theta_1$ of about 10.8° at a left side in the traveling direction with respect to a traveling direction $L_0$ of the contact strip 12. A terminating end section side of the slider $S_1$ is curved substantially parallel to the trolley wire T. Meanwhile, the slider $S_2$ is formed to approach the trolley wire T at the inclination angle $\theta_1$ of about 10.8° from a right side in the traveling direction with respect to the traveling direction $L_0$ of the contact strip 12. A starting end section side of the slider $S_2$ is curved substantially parallel to the trolley wire T.

The current collecting apparatus 3 shown in FIGS. 1A and 1B is an apparatus for inducing power from the trolley wire T to the vehicle 1. The current collecting apparatus 3 includes an underframe 4, an insulator 5, a framework 6, a shoe support part 7, a collector shoe (a shoe body) 8, and so on. The underframe 4 is a member configured to support the framework 6. The insulator 5 is a member configured to electrically insulate the vehicle body 2 from the underframe 4. The framework 6 is a link mechanism that can be operated in an upward and downward direction while supporting the collector shoe 8. The shoe support part 7 is a mechanism part configured to horizontally lift upward the collector shoe 8 with respect to the overhead line L, and apply a shock absorbing action by a spring (not shown). The shoe support part 7 is lifted upward by an uplift spring (not shown) included in the underframe 4. The current collecting apparatus 3 shown in FIGS. 1A, 1B and 2 is a single arm type pantograph asymmetrically formed with respect to the traveling direction $L_0$ of the vehicle 1 and usable in one direction or both directions. The current collecting apparatus 3 progresses in a flap direction in which the contact strip 12 is disposed at a rear side in the traveling direction with respect to the framework 6.

The collector shoe 8 shown in FIGS. 1A to 3 is a member in which the contact strip 12 is attached and support the contact strip 12, and a long member formed of a metal and generally elongated in a direction perpendicular to the trolley wire T. As shown in FIGS. 1B to 4B, the collector shoe 8 is a multi-segmentation contact strip body in which the contact strip 12 is divided into a plurality of pieces. The collector shoe 8 is a collector shoe of a Shinkansen (trademark) (high speed) pantograph in which, as the contact strip 12 is divided into a number of contact strip pieces 12a and 12b, a mass of the contact strip 12 in contact with the trolley wire T and excited therewith is reduced, and following performance with respect to the trolley wire T is improved. The collector shoe 8 includes a rectifying part 9 shown in FIGS. 5 to 7, a horn 10 shown in FIGS. 1A, 1B and 2, a contact strip assembly 11 shown in FIGS. 3 to 7, a shoe body frame 23 shown in FIGS. 5 to 7, a fixing guide part 24 shown in FIGS. 5 and 6, a resilient support part 25 shown in FIGS. 3 and 6, a fixing part 26 shown in FIG. 6, and so on.

Figure 6:
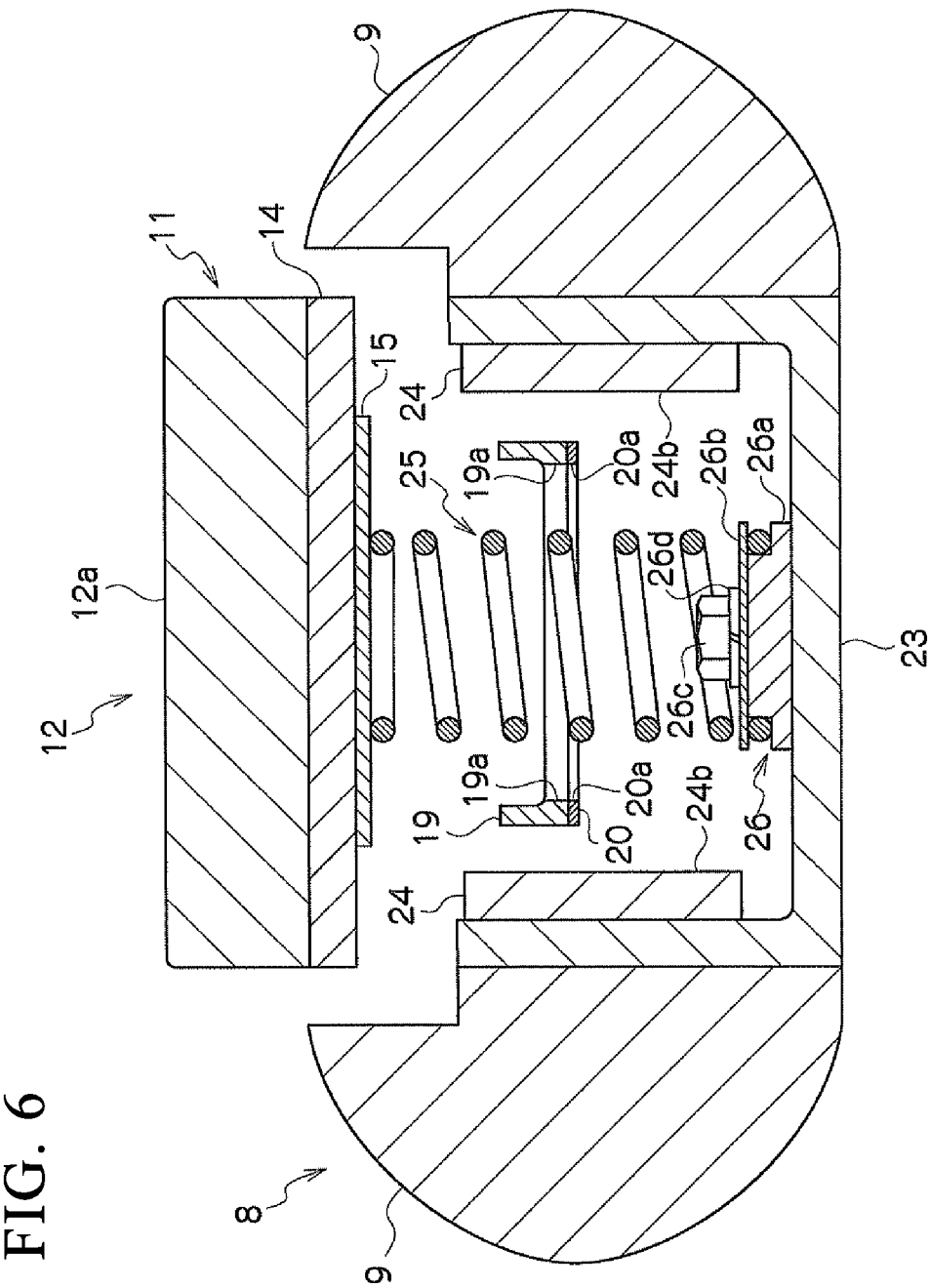
FIG. 6 is a cross-sectional view taken along line VI-VI of FIG. 3.
Figure 7:
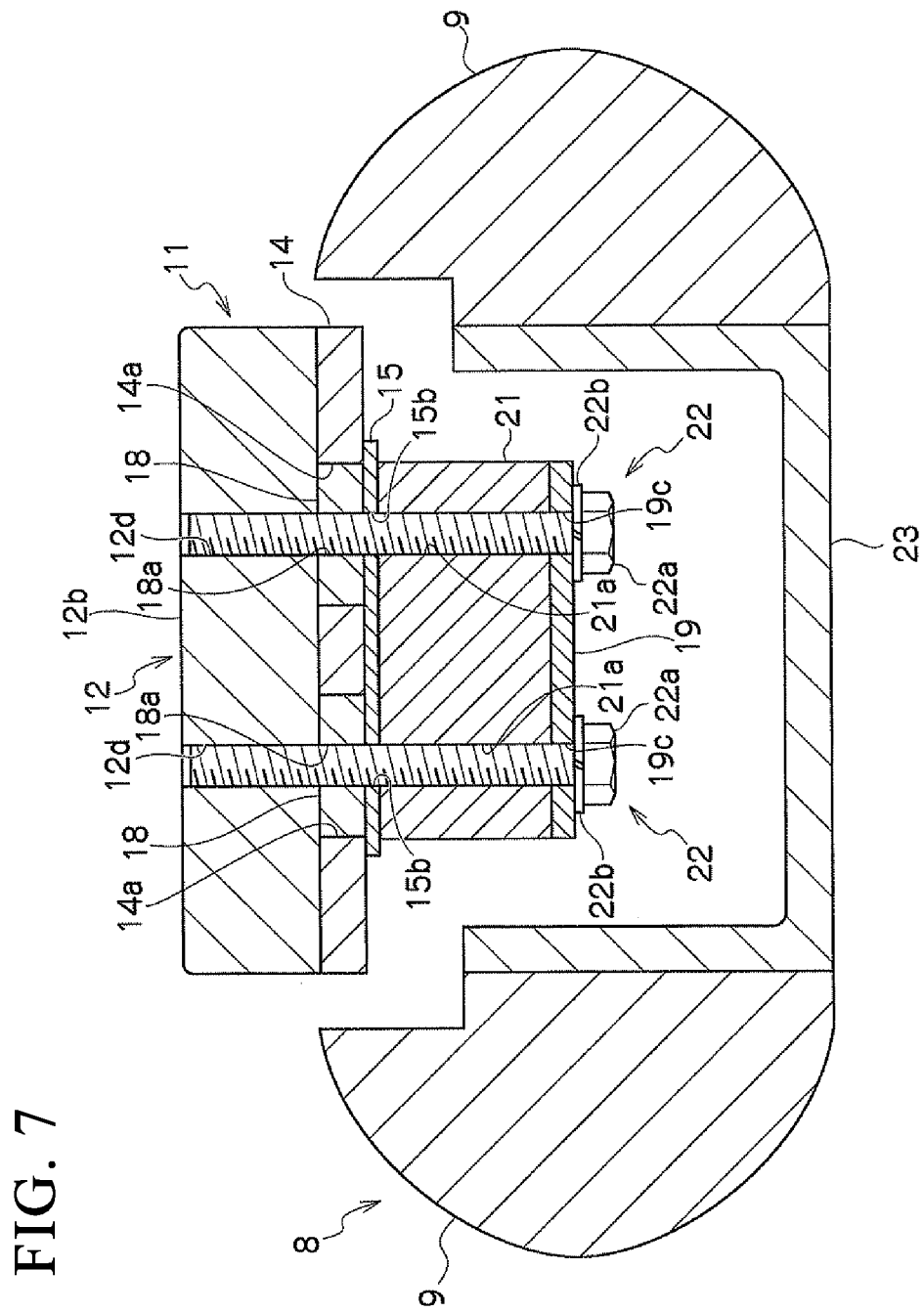
FIG. 7 is a cross-sectional view taken along line VII-VII of FIG. 3.

The rectifying part 9 shown in FIGS. 5 to 7 is a member configured to adjust a lifting power generated by an air stream. The rectifying part 9 is detachably installed at the shoe body frame 23 by a fixing member (not shown). A cross-sectional shape of the collector shoe 8 may be varied into an arbitrary shape by exchanging the rectifying part 9 with a member having an optimal shape.

The horn 10 shown in FIGS. 1A, 1B and 2 is a member configured to prevent interruption of the vehicle 1 to the trolley wire T in a direction different from the traveling direction of the two the trolley wires T crossing over a brancher when the vehicle 1 passes the brancher. As shown in FIGS. 1B and 2, the horn 10 is a metal member formed to protrude from both end sections in a longitudinal direction of the collector shoe 8, tip sections of which are bent.

Figure 3:
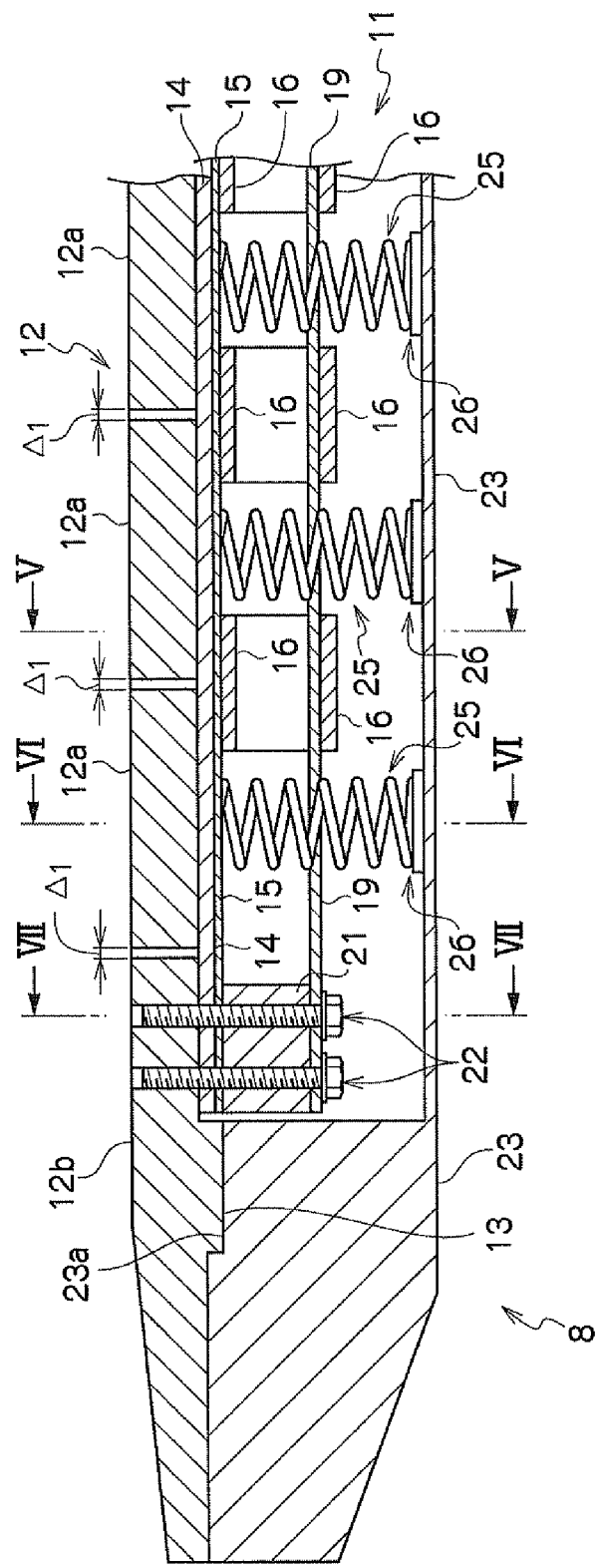
FIG. 3 is a cross-sectional view showing a collector shoe including the impact mitigating structure of the contact strip piece, a portion of which is omitted.

The contact strip assembly 11 shown in FIGS. 3 to 7 is a member formed by assembling major components of the collector shoe 8. The contact strip assembly 11 is an assembled product (a contact strip body) assembled in a state in which the plurality of contact strip pieces 12a and 12b, a plurality of movable guide parts 16, and so on, are arranged. As shown in FIG. 3, the contact strip assembly 11 is fitted into the shoe body frame 23 of the collector shoe 8 to be integrated with the shoe body frame 23. The contact strip assembly 11 includes the contact strip 12 shown in FIGS. 1A to 7, a mounting part 13 shown in FIGS. 3, 4A and 4B, a resilient part 14 and a conductive part 15 shown in FIGS. 3 to 7, the movable guide part 16 shown in FIGS. 3, 4B and 5, a fixing part 17 and an interval adjustment part 18 shown in FIGS. 4A, 4B and 5, a stopper part 19 shown in FIGS. 3 to 7, a shock absorbing part 20 shown in FIGS. 5 and 6, an interval adjustment part 21 shown in FIGS. 3, 4B and 7, a fixing part 22 shown in FIGS. 3, 4A, 4B and 7, and so on.

The contact strip 12 shown in FIGS. 1A to 7 is a member sliding with the trolley wire T. As shown in FIGS. 1A, 1B and 2, the contact strip 12 is a plate-shaped member formed of a metal or carbon and elongated in a direction perpendicular to the traveling direction of the vehicle 1, and a component constituting a portion of the contact strip assembly 11. A central section of the contact strip 12 has a function of a main contact strip sliding with the trolley wire T mainly when the vehicle 1 travels along a main line, and both end sections of the contact strip 12 function as an auxiliary contact strip having a lower sliding frequency than the main contact strip. Since a large current flows through the contact strip 12 as comes in contact (slides) with the trolley wire T and moves, a certain mechanical strength, conductivity and wear resistance are needed for the contact strip 12. As shown in FIGS. 1B to 3, the contact strip 12 is a contact strip divided into a plurality of pieces in the longitudinal direction, and includes a total of twelve contact strip pieces 12a attached to the central section of the collector shoe 8 shown in FIGS. 4A and 4B, and a total of two contact strip pieces 12b attached to both end sections of the collector shoe 8.

Figure 4A:
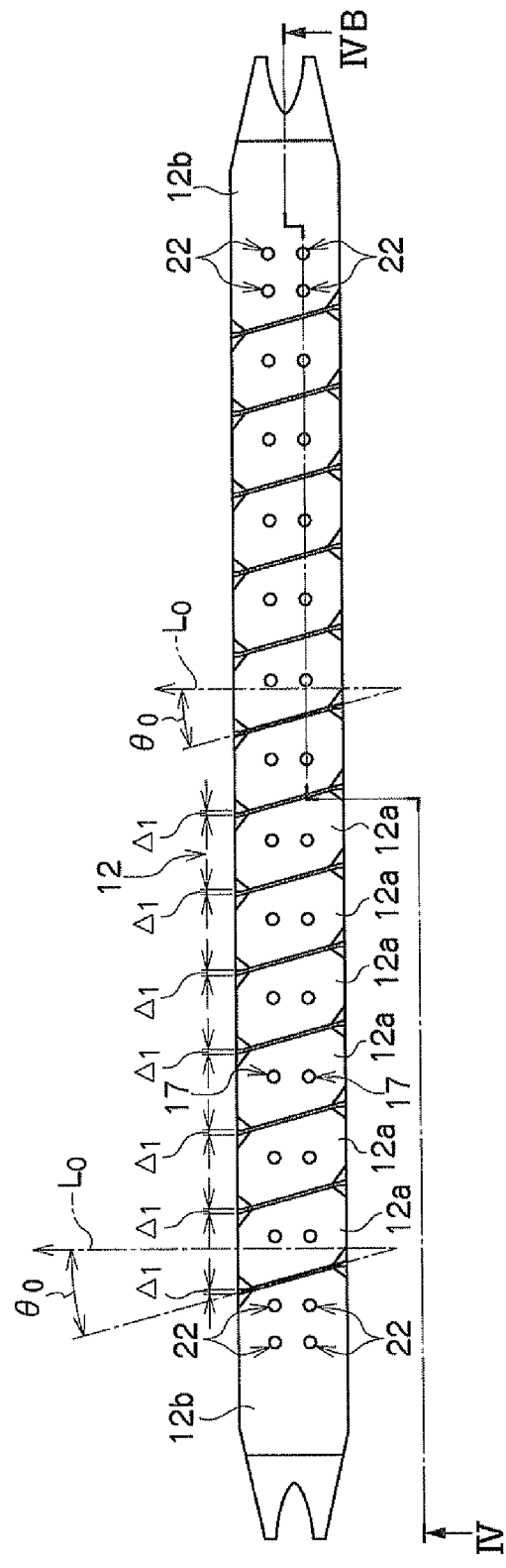
FIG. 4A is an outline plan view of a contact strip assembly including the impact mitigating structure of the contact strip piece according to the first embodiment of the present invention.
Figure 4B:
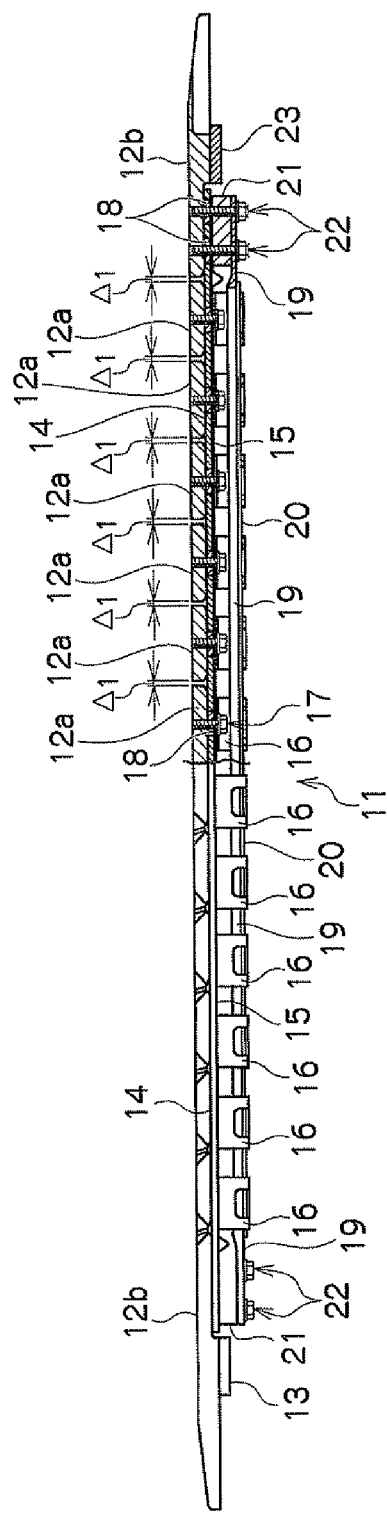
FIG. 4B is a cross-sectional view taken along line IV-IVB of FIG. 4A.

The contact strip piece 12a shown in FIGS. 1B to 6, 8 and 9A to 9F is a member constituting a major portion of the contact strip 12. As shown in FIGS. 3, 4A and 4B, the contact strip pieces 12a are contact strip small pieces disposed in the longitudinal direction of the collector shoe 8 at a predetermined interval (gap) $\Delta_1$ in a row to prevent interference between the neighboring contact strip pieces 12a. The contact strip piece 12a is formed to have a predetermined width (for example, 52 mm), a length (for example, 74 mm) and a thickness (for example, 10 mm). For example, as shown in FIGS. 4A, 8 and 9A to 9F, the contact strip piece 12a is a thin plate-shaped member having an external shape of a parallelogram. The contact strip piece 12a is linearly cut at both side sections at the inclination angle $\theta_0$ of about 15° with respect to the traveling direction $L_0$ of the contact strip 12. In addition, an interval $\Delta_1$ of 2 mm is formed between the contact strip piece 12a and the neighboring contact strip pieces 12a. For example, the contact strip pieces 12a include two aluminum pieces configured to function as an auxiliary contact strip and formed at both end sections, and ten iron-based sintered alloy pieces configured to function as a main contact strip and formed at a central section (for example, a range of 540 mm). The contact strip pieces 12a can respectively and independently move in the upward and downward directions according to variation in contact force C applied between the trolley wire T and the contact strip piece 12a through contact with the trolley wire T, and displacement in the upward and downward direction of the trolley wire T. The contact strip piece 12a includes an impact mitigating structure configured to mitigate an impact generated upon collision with the sliders $S_1$ and $S_2$ shown in FIG. 2. The contact strip piece 12a includes a female screw section 12c shown in FIGS. 5, 8 and 9A, an end surface section 12e, a side surface section 12g, a corner 12i, and an impact mitigating part 12k shown in FIGS. 8 and 9A to 9F, and so on.

Figure 8:
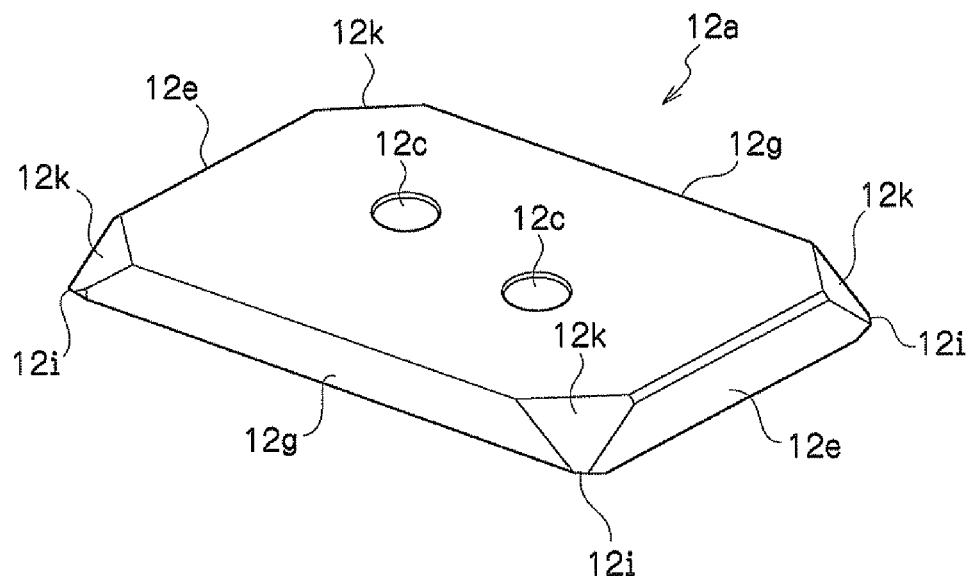
FIG. 8 is a perspective view of a main contact strip piece including the impact mitigating structure of the contact strip piece according to the first embodiment of the present invention.
Figure 9A:
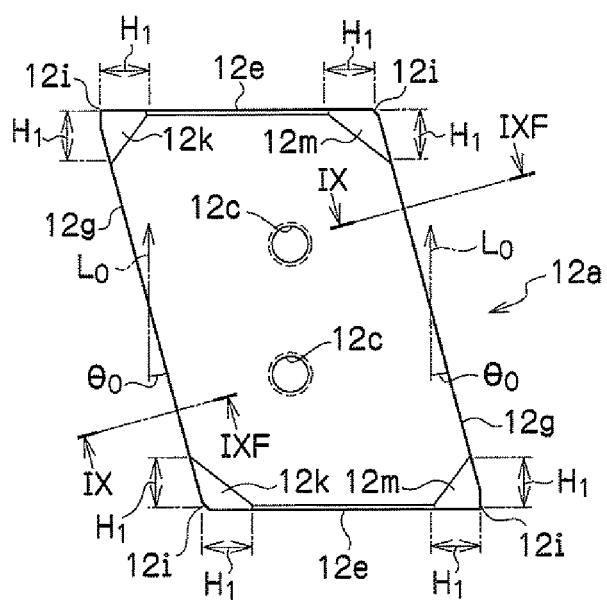
FIG. 9A is an outline plan view of the main contact strip piece includes the impact mitigating structure of the contact strip piece according to the first embodiment of the present invention.

The female screw section 12c shown in FIGS. 5, 8 and 9A is a portion threaded with a male screw part of a fixing bolt 17a. The female screw section 12c is formed to pass through the contact strip piece 12a. The end surface sections 12e shown in FIGS. 8 and 9A to 9F are portions formed at a front side in the traveling direction and a rear side in the traveling direction of the contact strip piece 12a. The end surface section 12e is a flat surface (a tip surface) formed perpendicular to a surface of the contact strip piece 12a. The side surface section 12g is a portion formed at a side at which the contact strip pieces 12a are adjacent to each other. The side surface section 12g is a flat surface inclined at the inclination angle $\theta_0$ with respect to the traveling direction $L_0$ of the contact strip piece 12a and perpendicular to the surface of the contact strip piece 12a. The corner 12i is a portion intersecting the end surface section 12e and the side surface section 12g. As shown in FIG. 9A, the corners 12i are formed at portions intersecting the end surface section 12e and the side surface section 12g at an acute angle and an obtuse angle, respectively.

The contact strip piece 12b shown in FIGS. 1B to 4B, 7 and 10A to 10C is a member constituting an auxiliary portion of the contact strip 12. The contact strip piece 12b has a function of an auxiliary contact strip, similar to the two contact strip pieces 12a of both end sections. For example, as shown in FIGS. 4A and 10A to 10C, the contact strip piece 12b is a thin plate-shaped member having a tip section divided into two pieces, and has a predetermined width (for example, 52 mm), length (for example, 175 mm) and thickness (for example, 8 mm). A side portion of the contact strip piece 12b adjacent to the contact strip piece 12a is linearly cut at the inclination angle $\theta_0$ of about 15° with respect to the traveling direction $L_0$ of the contact strip 12. In addition, in order to prevent interference between the neighboring contact strip pieces 12a and 12b, the interval $\Delta_1$ of 2 mm is formed between the contact strip piece 12b and the neighboring contact strip piece 12a. For example, the contact strip piece 12b is a thin plate-shaped member formed of aluminum, and a light weight is more important than wear resistance because a frequency of contacting the trolley wire T is lower than that of the contact strip piece 12a of the central section. Like the contact strip piece 12a, the contact strip piece 12b includes an impact mitigating structure configured to mitigate an impact generated upon collision with the sliders $S_1$ and $S_2$ shown in FIG. 2. The contact strip piece 12b includes a female screw section 12d shown in FIGS. 7 and 10A, end surface sections 12f, side surface sections 12h, corners 12j, and impact mitigating parts 12m shown in FIGS. 10A to 10C, and so on.

Figure 10A:
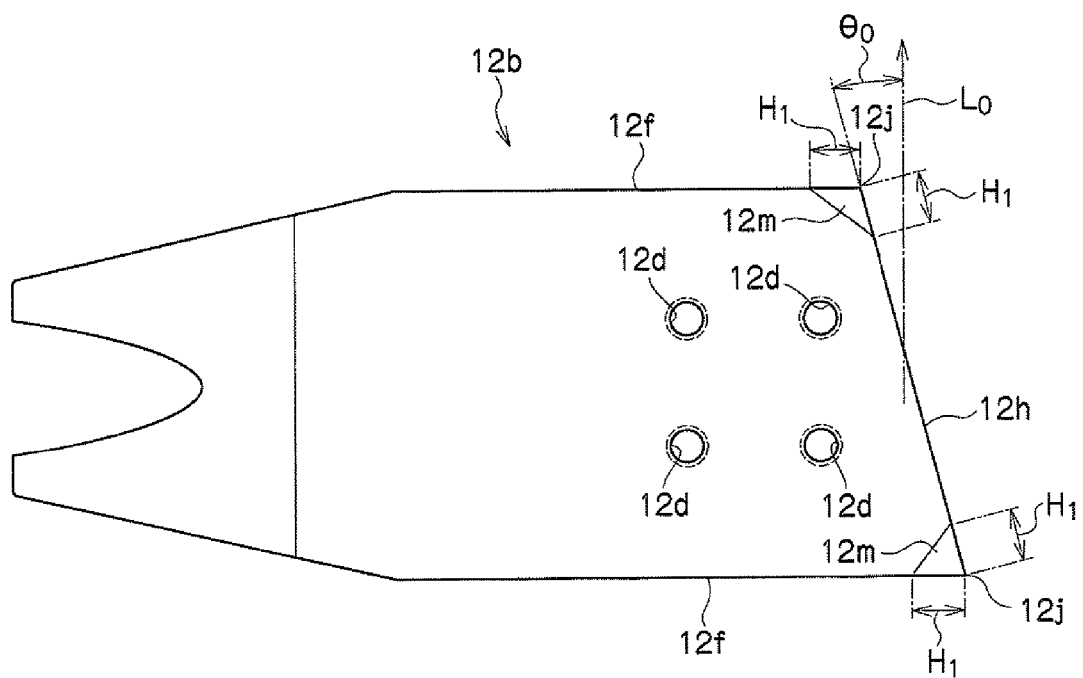
FIG. 10A is an outline plan view of an auxiliary contact strip piece including the impact mitigating structure of the contact strip piece according to the first embodiment of the present invention.
Figure 10B:
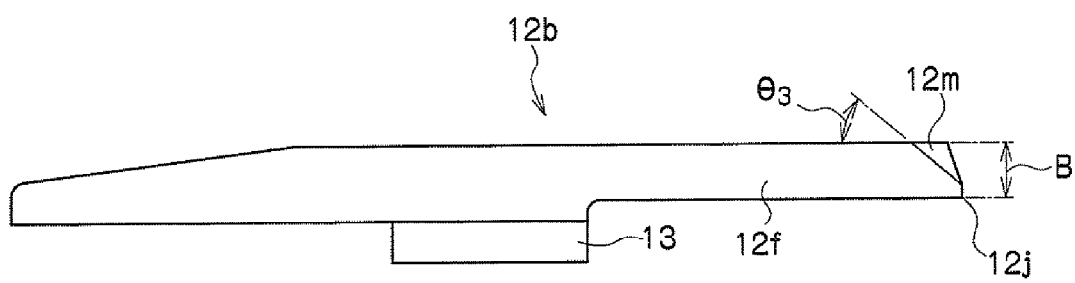
FIG. 10B is an outline front view of the auxiliary contact strip piece including the impact mitigating structure of the contact strip piece according to the first embodiment of the present invention.
Figure 10C:
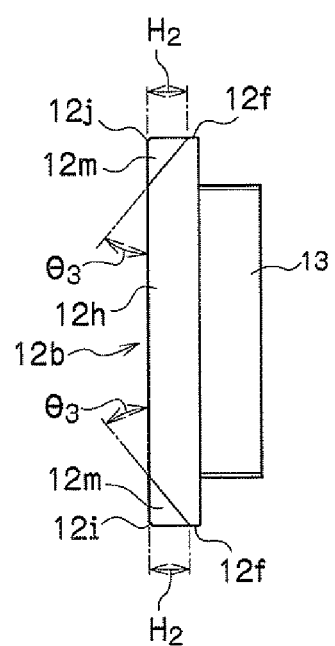
FIG. 10C is an outline right side view of the auxiliary contact strip piece including the impact mitigating structure of the contact strip piece according to the first embodiment of the present invention.

The female screw section 12d shown in FIGS. 7 and 10A is a portion threaded with a male screw part of a fixing bolt 22a. The female screw section 12d is formed to pass through the contact strip piece 12b. The end surface sections 12f shown in FIGS. 10A to 10C are portions formed at a front side in the traveling direction and a rear side in the traveling direction of the contact strip piece 12b. The end surface section 12f is a flat surface (a tip surface) perpendicular to the surface of the contact strip piece 12b. The side surface sections 12h are portions formed at sides at which the contact strip pieces 12a are adjacent to each other. The side surface section 12h is a flat surface inclined at the inclination angle $\theta_0$ with respect to the traveling direction $L_0$ of the contact strip piece 12a and perpendicular to the contact strip piece 12b. The corner 12j is a portion intersecting the end surface section 12f and the side surface section 12h. As shown in FIG. 10A, the corners 12j are formed at positions intersecting the end surface section 12f and the side surface section 12h at an acute angle and an obtuse angle, respectively.

Figure 9B:
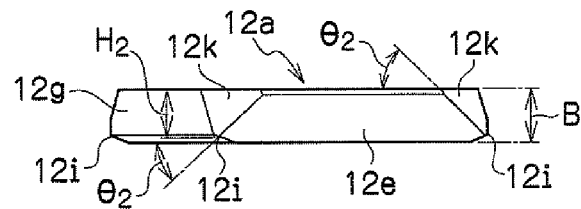
FIG. 9B is an outline front view of the main contact strip piece including the impact mitigating structure of the contact strip piece according to the first embodiment of the present invention.
Figure 9C:
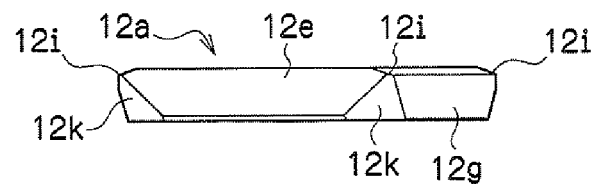
FIG. 9C is an outline rear view of the main contact strip piece including the impact mitigating structure of the contact strip piece according to the first embodiment of the present invention.
Figure 9D:
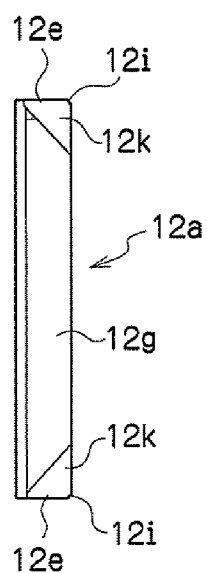
FIG. 9D is an outline right side view of the main contact strip piece including the impact mitigating structure of the contact strip piece according to the first embodiment of the present invention.
Figure 9E:
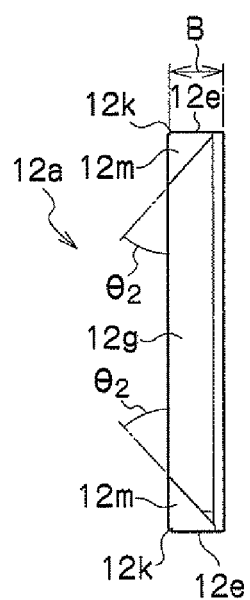
FIG. 9E is an outline left side view of the main contact strip piece including the impact mitigating structure of the contact strip piece according to the first embodiment of the present invention.
Figure 9F:
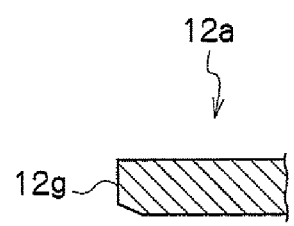
FIG. 9F is a cross-sectional view taken along line IX-IXF of FIG. 9A.

The impact mitigating part 12k shown in FIGS. 8 and 9A to 9F is a portion installed between the neighboring contact strip pieces 12a and configured to mitigate an impact generated when the contact strip piece 12a collides with the sliders $S_1$ and $S_2$. Meanwhile, the impact mitigating part 12m shown in FIGS. 10A to 10C is a portion installed between the neighboring contact strip pieces 12a and 12b and configured to mitigate an impact generated when the contact strip pieces 12a and 12b collide with the sliders $S_1$ and $S_2$. For example, the impact mitigating parts 12k and 12m prevent interference between the corners 12i and 12j of the contact strip pieces 12a and 12b and the side surfaces of the sliders $S_1$ and $S_2$ when the contact strip 12 passes through the sectioning point S shown in FIG. 2. Both of the impact mitigating parts 12k and 12m have the same structure. The impact mitigating parts 12k shown in FIGS. 8 and 9A to 9F are formed at four corners 12i. The impact mitigating parts 12m shown in FIGS. 10A to 10C are formed at two corners 12j. As shown in FIGS. 8 to 10C, the impact mitigating parts 12k and 12m are chamfered sections formed at the corners 12i and 12j. The impact mitigating parts 12k and 12m are formed by mechanical processing such as cutting or sintering using a forming die of the corners 12i and 12j. The impact mitigating parts 12k and 12m are formed such that a contact area between the trolley wire T and the contact strip pieces 12a and 12b is not reduced in comparison with the product of the related art when the contact strip pieces 12a and 12b are new products. The impact mitigating parts 12k and 12m are formed as inclined flat surfaces at predetermined inclination angles $\theta_2$ and $\theta_3$ inclined obliquely upward in a direction from a front side in the traveling direction toward a rear side in the traveling direction of the contact strip 12. For example, the impact mitigating part 12k has chamfering dimensions $H_1=10$ mm and $H_2=9$ mm, and the inclination angle $\theta_2 \approx 45°$ as shown in FIGS. 9A and 9B. Meanwhile, for example, the impact mitigating part 12m has chamfering dimensions $H_1=10$ mm and $H_2=8$ mm, and the inclination angle $\theta_3 \approx 45°$ as shown in FIGS. 10A and 10B.

Figure 11A:
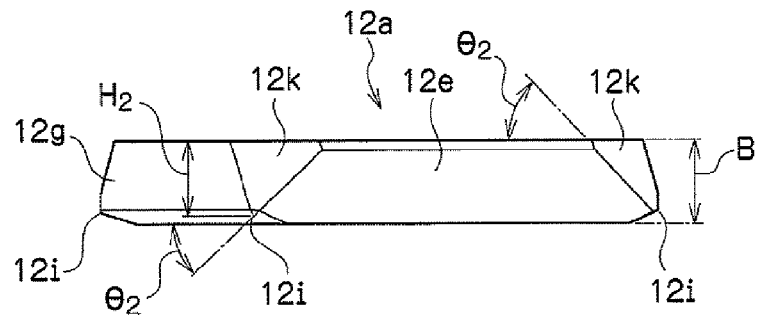
FIG. 11A is a front view showing a state before abrasion of the main contact strip piece of the contact strip piece including the impact mitigating structure of the contact strip piece according to the first embodiment of the present invention.
Figure 11B:
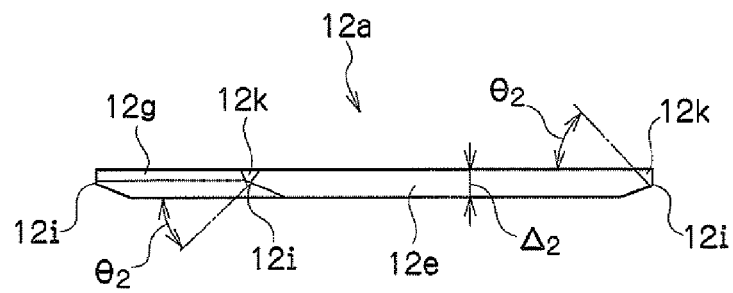
FIG. 11B is a front view showing a state after abrasion of the main contact strip piece of the contact strip piece including the impact mitigating structure of the contact strip piece according to the first embodiment of the present invention.
Figure 11C:
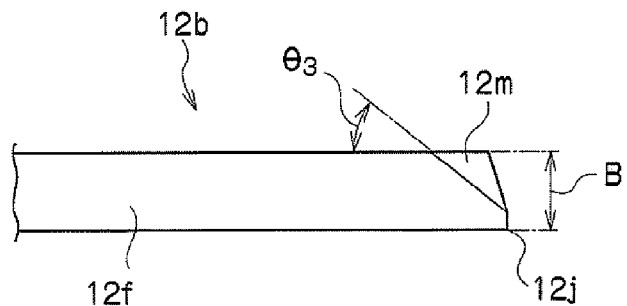
FIG. 11C is a front view showing a state before abrasion of an auxiliary contact strip piece of the contact strip piece including the impact mitigating structure of the contact strip piece according to the first embodiment of the present invention.
Figure 11D:
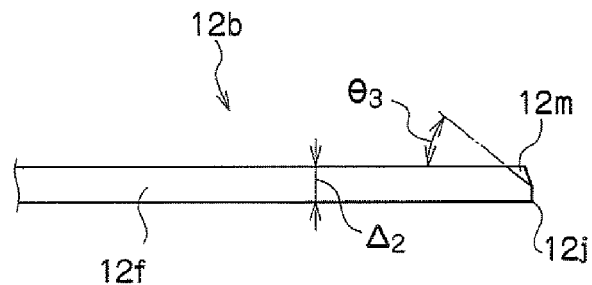
FIG. 11D is a front view showing a state after abrasion of the auxiliary contact strip piece of the contact strip piece including the impact mitigating structure of the contact strip piece according to the first embodiment of the present invention.

As shown in FIGS. 11A to 11D, the impact mitigating parts 12k and 12m shown in FIGS. 8 to 10C remain until the contact strip pieces 12a and 12b arrive at a predetermined abrasion loss. For example, as shown in FIG. 11A, the impact mitigating part 12k is used from a state in which the contact strip piece 12a is a new product before abrasion having a thickness B=10 mm, and as shown in FIG. 11B, even when the contact strip piece 12a arrives at a use limit of a residual amount $\Delta_2=2$ mm, the chamfered section remains. Then, the impact mitigating part 12k maintains a function of mitigating an impact until arriving at the limit abrasion loss. Similarly, for example, as shown in FIG. 11C, the impact mitigating part 12m is used from a state in which the contact strip piece 12b is a new product before abrasion having a thickness B=10 mm, and as shown in FIG. 11D, even when the contact strip piece 12b arrives at a use limit of a residual amount $\Delta_2=3$ mm, the chamfered section remains. Then, the impact mitigating part 12m maintains a function of mitigating an impact until arriving at the limit abrasion loss. When the chamfering dimensions $H_1$ and $H_2$ of the impact mitigating parts 12k and 12m exceed the thickness B, shapes of the contact strip pieces 12a and 12b may be varied to exert an influence on aerodynamic characteristics or the like. Meanwhile, when the chamfering dimensions $H_1$ and $H_2$ of the impact mitigating parts 12k and 12m are too small, an impact mitigating function disappears before the contact strip pieces 12a and 12b arrive at the use limit. For this reason, in the impact mitigating part 12k, for example, when the contact strip piece 12a has a thickness B=10 mm, a use limit of a residual amount $\Delta_2=2$ mm, the chamfering dimension $H_1$ may be set within a range of 9 to 10 mm. In addition, in the impact mitigating part 12m, for example, when the contact strip piece 12b has a thickness B=10 mm, and a use limit of a residual amount $\Delta_2=3$ mm, the chamfering dimension $H_1$ may be set within a range of 8 to 10 mm.

The mounting part 13 shown in FIGS. 3, 4A and 4B is a member configured to detachably mount the contact strip assembly 11 on the shoe body frame 23 of the collector shoe 8. The mounting part 13 is a thin plate-shaped member having a rectangular external shape, which is detachably fixed to a lower surface of the contact strip piece 12b by a fixing member such as a bolt or the like (not shown). As shown in FIG. 3, the mounting parts 13 are convex-shaped fitting parts that can be fitted into mounting parts 23a of the shoe body frame 23 side, and disposed at both end sections of the contact strip 12 to protrude from the lower surface of the contact strip 12. A height of the mounting part 13 is set to be slightly smaller than a sum of thicknesses of the resilient part 14 and the conductive part 15 such that the interval adjustment part 21 does not interfere with the mounting part 13 when the interval adjustment part 21 is inserted between the stopper part 19 and the conductive part 15 in the lateral direction. As shown in FIGS. 4A and 4B, the mounting parts 13 are disposed at both end sections of the contact strip 12. The mounting part 13 also has a function of a benchmark when the resilient part 14, the conductive part 15 and the interval adjustment part 21 are positioned at the contact strip piece 12b.

The resilient part 14 shown in FIGS. 3 to 7 is a member configured to resiliently deform according to movement in the upward and downward directions of the contact strip 12. The resilient part 14 is a long plate-shaped flexible member (a seat-shaped member) having arc resistance and non-conductivity. The lower surfaces of the contact strip pieces 12a and 12b come in contact with the upper surface of the resilient part 14. For example, the resilient part 14 is a plastic seat having a three-layered sandwich structure in which silicon rubber is adhered to both surfaces of a glass cross fiber. The resilient part 14 is bent according to upward and downward movement of the contact strip piece 12a when the contact strip piece 12a moves in the upward and downward directions according to displacement of the trolley wire T. As shown in FIGS. 5 and 7, the resilient part 14 has through-holes 14a disposed in a lengthwise direction and a widthwise direction of the resilient part 14 at predetermined intervals.

The conductive part 15 shown in FIGS. 3 to 7 is a member configured to secure a current path. The conductive part 15 is a conductive member formed by arranging a plurality of (for example, one set of five) copper plates having flexibility that can be resiliently deformed with the resilient part 14. A width of the conductive part 15 is formed to be smaller than that of the resilient part 14 as shown in FIGS. 5 to 7. The conductive part 15 has a through-hole 15*a* passing through the conductive part 15 and configured to allow insertion of the fixing bolt 17*a* shown in FIG. 5, and a through-hole 15*b* passing through the conductive part 15 and configured to allow insertion of the fixing bolt 22*a* shown in FIG. 7. As shown in FIGS. 5 to 7, a lower surface of the resilient part 14 comes in contact with the upper surface of the conductive part 15, and upper surfaces of the movable guide part 16, the interval adjustment part 21 and the resilient support part 25 come in contact with the lower surface of the conductive part 15.

The movable guide part 16 shown in FIGS. 3 to 5 is a member moving with the contact strip piece 12*a*. As shown in FIG. 5, the movable guide part 16 is a hollow frame member having a rectangular cross section. The movable guide part 16 is integrally formed with the contact strip piece 12*a*, the resilient part 14 and the conductive part 15 to be slid in the upward and downward directions. As shown in FIGS. 3, 4A and 4B, the plurality of movable guide parts 16 are disposed in a longitudinal direction of the shoe body frame 23 at predetermined intervals. As shown in FIG. 5, the movable guide part 16 includes a through-hole 16*a* passing through an upper portion of the movable guide part 16, a sliding surface 16*b* sliding with a sliding surface 24*b* of the fixing guide part 24 side, a through-hole 16*c* passing through the movable guide part 16 to allow insertion of the fixing bolt 17*a*, and so on. The movable guide part 16 slides in the upward and downward directions in response to upward and downward movement of the contact strip piece 12*a*, when the contact strip piece 12*a* moves in the upward and downward directions according to displacement of the trolley wire T.

The fixing part 17 shown in FIGS. 4A, 4B and 5 is a member configured to fix the contact strip piece 12*a* and the movable guide part 16. As shown in FIG. 5, the fixing part 17 detachably fixes the movable guide part 16 to the contact strip piece 12*a* to sandwich the resilient part 14 and the conductive part 15 between the lower surface of the contact strip piece 12*a* and the upper surface of the movable guide part 16. The fixing part 17 includes the fixing bolt (a contact strip piece attachment bolt) 17*a* having a tip section passing through the through-holes 15*a*, 16*a* and 18*a* to be threaded with the female screw section 12*c* of the contact strip piece 12*a*, and a metal washer 17*b* sandwiched between the fixing bolt 17*a* and the movable guide part 16.

The interval adjustment part 18 shown in FIGS. 4A, 4B, 5 and 7 is a member configured to adjust an interval between the contact strip pieces 12*a* and 12*b* and the conductive part 15. As shown in FIGS. 5 and 7, the interval adjustment part 18 is an annular collar or the like fitted into the through-hole 14*a* of the resilient part 14, and functions as a spacer configured to fill the gap between the contact strip piece 12*a* and the conductive part 15 to electrically connect them. The interval adjustment part 18 has through-holes 18*a* through which the fixing bolts 17*a* and 22*a* pass. As shown in FIG. 5, the interval adjustment part 18 is sandwiched between the contact strip pieces 12*a* and 12*b* and the conductive part 15 to constantly adjust an interval between the contact strip pieces 12*a* and 12*b* and the conductive part 15.

The stopper part 19 shown in FIGS. 3 to 7 is a member configured to restrict a movable range of the movable guide part 16 within a predetermined range. As shown in FIG. 5, the stopper part 19 is a thin plate-shaped member having a substantially W-shaped cross section, and passes through the inside of the movable guide part 16 as shown in FIGS. 3, 4A and 4B. As shown in FIG. 3, both end sections of the stopper part 19 are fixed with respect to an inner bottom surface of the shoe body frame 23 at a predetermined height. As shown in FIG. 5, in the stopper part 19, as the lower bottom surface of the stopper part 19 comes in contact with the lower upper surface of the movable guide part 16, an upper limit of the movable range (a movement amount in the upward and downward directions) of the movable guide part 16 is defined, and as the upper end surface of the stopper part 19 comes in contact with the upper lower surface of the movable guide part 16, a lower limit of the movable range of the movable guide part 16 is defined. The stopper part 19 prevents the contact strip piece 12*a*, the resilient part 14 and the movable guide part 16 from falling of from the shoe body frame 23 as the movable guide part 16 moves upward with the contact strip piece 12*a* and the resilient part 14 by the resilient force of the resilient support part 25 shown in FIG. 3. As shown in FIG. 6, the stopper part 19 includes a through-hole 19*a* passing through the stopper part 19 to allow insertion of the resilient support part 25, a through-hole 19*b* passing through the stopper part 19 to allow insertion of the fixing bolt 17*a* as shown in FIG. 5, a through-hole 19*c* passing through the stopper part 19 to allow insertion of the fixing bolt 22*a* as shown in FIG. 7, and so on.

The shock absorbing part 20 shown in FIGS. 5 and 6 is a member configured to mitigate an impact generated when the lower bottom surface of the stopper part 19 collides with the lower upper surface of the movable guide part 16. For example, the shock absorbing part 20 is a thin plate-shaped member formed of rubber. The shock absorbing part 20 is fixed to the lower bottom surface of the stopper part 19 in the longitudinal direction of the stopper part 19 by an adhesive agent as shown in FIGS. 4A and 4B. As shown in FIG. 6, the shock absorbing part 20 has a through-hole 20*a* passing through the shock absorbing part 20 to allow insertion of the resilient support part 25, a through-hole 20*b* passing through the shock absorbing part 20 to allow insertion of the fixing bolt 17*a* as shown in FIG. 5.

The interval adjustment part 21 shown in FIGS. 3, 4B and 7 is a member configured to adjust an interval between the conductive part 15 and the stopper part 19. The interval adjustment part 21 is a thick plate-shaped member fitted between the lower surface of the conductive part 15 and the upper surface of the stopper part 19. The interval adjustment part 21 has a function of a spacer configured to fill the gap between both end sections of the conductive part 15 and both end sections of the stopper part 19 as shown in FIG. 4B. As shown in FIG. 7, the interval adjustment part 21 has a through-hole 21*a* through which the fixing bolt 22*a* passes. The interval adjustment part 21 is sandwiched between the conductive part 15 and the stopper part 19 to constantly adjust the interval between the conductive part 15 and the stopper part 19.

The fixing part 22 shown in FIGS. 3, 4A, 4B and 7 is a member configured to fix the contact strip piece 12*b* and the stopper part 19. As shown in FIGS. 3 and 7, the fixing part 22 detachably fixes the stopper part 19 to the contact strip piece 12*b* so as to sandwich the resilient part 14, the conductive part 15 and the interval adjustment part 21 between the lower surface of the contact strip piece 12*b* and the upper surface of the stopper part 19. As shown in FIG. 7, the fixing part 22 includes a fixing bolt (a contact strip piece attachment bolt) 22*a* having a tip section passing through the through-holes 15*b*, 18*a*, 19*c* and 21*a* to be threaded with the female screw section 12*d* of the contact strip piece 12*b*, a metal washer 22*b* sandwiched between the fixing bolt 22*a* and the stopper part 19, and so on.

The shoe body frame 23 shown in FIGS. 3 and 5 to 7 is a member constituting a main body portion of the collector shoe 8. As shown in FIGS. 5 to 7, the shoe body frame 23 is a groove type frame member having a substantially U-shaped cross-section. An aperture part is formed in the upper portion of the shoe body frame 23, and the movable guide part 16, the stopper part 19, the fixing guide part 24, the resilient support part 25, and so on, are accommodated in the shoe body frame 23. The rectifying parts 9 are attached to outer side surfaces (a front surface and a rear surface) of the shoe body frame 23, and the shoe support part 7 shown in FIGS. 1A and 1B is attached to the lower surface of the shoe body frame 23. As shown in FIG. 3, thick plate-shaped portions having a predetermined length with no groove are formed at both end sections of the shoe body frame 23. The lower surface of the contact strip piece 12*b* is attached to the upper surface of the thick plate-shaped portion. The shoe body frame 23 includes the mounting part 23*a* configured to detachably mount the mounting part 13 of the contact strip assembly 11 side. The mounting part 23*a* is a concave-shaped fitting part that can be fitted onto the mounting part 13.

The fixing guide parts 24 shown in FIGS. 5 and 6 are members configured to movably guide the movable guide part 16. The fixing guide parts 24 are long plate-shaped members attached to both side surfaces inside the shoe body frame 23 to oppose each other. As shown in FIG. 5, the fixing guide part 24 includes the sliding surface 24*b* sliding with the sliding surface 16*b* of the movable guide part 16 side. The fixing guide part 24 has a function of the stopper part configured to allow movement in a vertical direction of the movable guide part 16 and restrict movement in a horizontal direction of the movable guide part 16. The fixing guide part 24 movably guides the movable guide part 16 such that the movable guide part 16 can move in the upward and downward directions according to displacement of the trolley wire T.

The resilient support part 25 shown in FIGS. 3 and 6 is a member configured to resiliently support the contact strip piece 12*a*. The resilient support part 25 is a resilient body (a biasing member) such as a compression coil spring or the like configured to receive compression. The same number of resilient support parts 25 as the contact strip pieces 12*a* are disposed between the neighboring movable guide parts 16 to correspond to the contact strip pieces 12*a* as shown in FIGS. 3 and 6. As shown in FIG. 6, an upper end section of the resilient support part 25 passes through the through-hole 19*a* of the stopper part 19 and the through-hole 20*a* of the shock absorbing part 20 to come in contact with the lower surface of the conductive part 15, and a lower end section of the resilient support part 25 is attached to a bottom upper surface of the shoe body frame 23. As shown in FIGS. 3 and 6, the resilient support part 25 supports the contact strip piece 12*a* via the resilient part 14 and the conductive part 15. The resilient support part 25 elongates or contracts in response to the contact force C applied between the contact strip piece 12*a* and the trolley wire T shown in FIGS. 1A and 1B.

The fixing part 26 shown in FIG. 6 is a member configured to fix the resilient support part 25 to the shoe body frame 23. The fixing part 26 includes a holding plate 26*a* attached to an inner bottom surface of the shoe body frame 23 and configured to hold the lower end section of the resilient support part 25, a presser plate 26*b* configured to sandwich the lower end section of the resilient support part 25 between the holding plate 26*a* and the presser plate 26*b* and press the lower end section of the resilient support part 25, a fixing bolt 26*c* configured to fix the holding plate 26*a* and the presser plate 26*b* to the shoe body frame 23, a metal washer 26*d* sandwiched between the fixing bolt 26*c* and the presser plate 26*b*, and so on.

Next, an operation of the collector shoe including the impact mitigating structure of the contact strip piece according to the first embodiment of the present invention will be described.

As shown in FIGS. 1A and 1B, when the vehicle 1 travels in the traveling direction $L_0$, the contact strip 12 moves with respect to the trolley wire T while contacting the trolley wire T, and the trolley wire T is lifted upward according to progress of the contact strip 12. Since the trolley wire T is supported at support points by overhead line metal fittings in the longitudinal direction at predetermined intervals, the vicinity of the support point of the trolley wire T becomes a hard spot. For this reason, while an uplift amount by which the contact strip 12 displaces the trolley wire T in an upward direction is reduced in the vicinity of the support point, the uplift amount is increased in the vicinity of a center between the support points of the trolley wire T. As a result, upward and downward wave motions of the contact strip 12 are repeated according to traveling of the vehicle 1, and a separation line in which the contact strip 12 is separated from the trolley wire T occurs. The contact strip body according to the embodiment is distinguished from the contact strip body of the related art in that the contact strip 12 is divided into the number of the contact strip pieces 12*a* and 12*b*. For this reason, in the contact strip body according to the embodiment, a weight of each of the contact strip pieces 12*a* is reduced. In addition, the contact strip piece 12*a* is smoothly supported by the resilient part 14 and the conductive part 15, and each of the contact strip pieces 12*a* is supported by the independent resilient support part 25. For this reason, when the contact force C is applied to each of the contact strip pieces 12*a*, the resilient part 14 and the conductive part 15 are bent against the resilient force of the resilient support part 25, and the contact strip piece 12*a* to which the contact force C is applied is displaced. Further, the contact strip pieces 12*a* neighboring both sides of the contact strip piece 12*a* are also displaced according thereto. As a result, the following performance of the contact strip piece 12*a* to the trolley wire T is improved to reduce the separation line and improve current collecting performance. In addition, damage to the contact strip 12 due to a separation line arc generated between the contact strip piece 12*a* and the trolley wire T is reduced.

Next, an operation of the impact mitigating structure of the contact strip piece according to the embodiment of the present invention will be described.

Figure 12A:
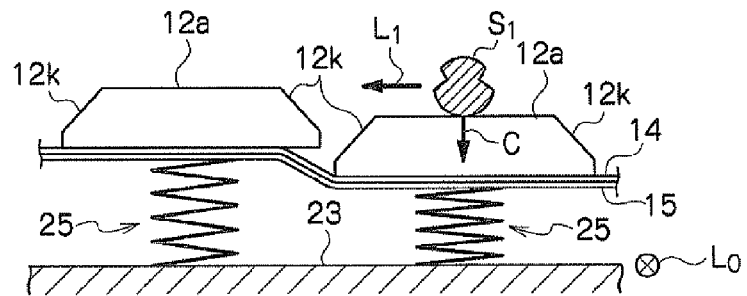
FIG. 12A is a schematic view for describing an action of the impact mitigating structure of the contact strip piece according to the first embodiment of the present invention, and a schematic view showing a state in which a slider of the sectioning point sliding with the main contact strip piece is displaced in a lateral direction, from a rear side in a traveling direction of the contact strip in chronological order.
Figure 12B:
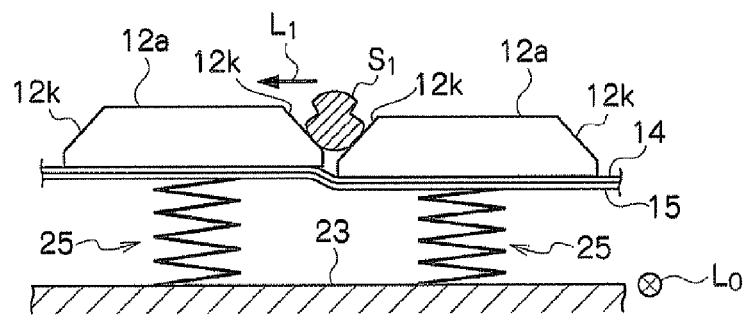
FIG. 12B is a schematic view for describing an action of the impact mitigating structure of the contact strip piece according to the first embodiment of the present invention, and a schematic view showing a state in which the slider of the sectioning point sliding with the main contact strip piece is displaced in the lateral direction, from the rear side in the traveling direction of the contact strip in chronological order.
Figure 12C:
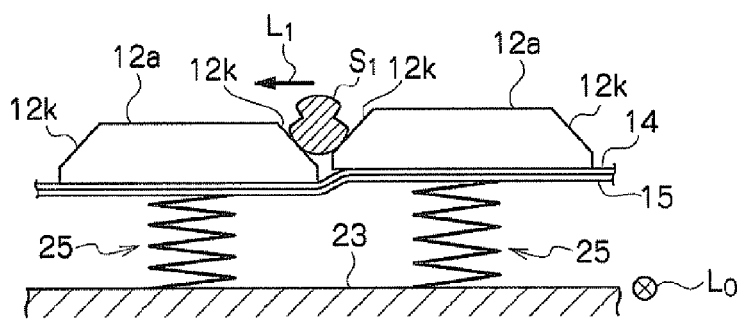
FIG. 12C is a schematic view for describing an action of the impact mitigating structure of the contact strip piece according to the first embodiment of the present invention, and a schematic view showing a state in which the slider of the sectioning point sliding with the main contact strip piece is displaced in the lateral direction, from the rear side in the traveling direction of the contact strip in chronological order.
Figure 12D:
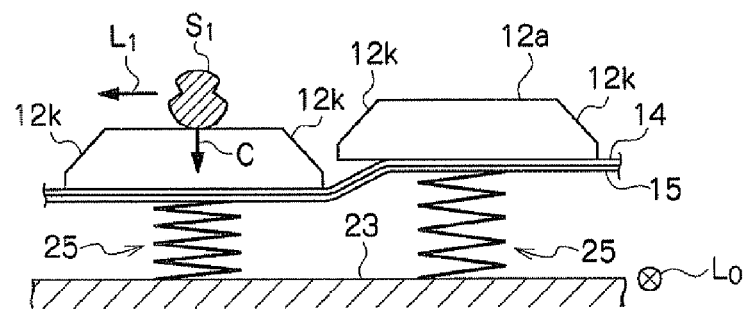
FIG. 12D is a schematic view for describing an action of the impact mitigating structure of the contact strip piece according to the first embodiment of the present invention, and a schematic view showing a state in which the slider of the sectioning point sliding with the main contact strip piece is displaced in the lateral direction, from the rear side in the traveling direction of the contact strip in chronological order.
Figure 13A:
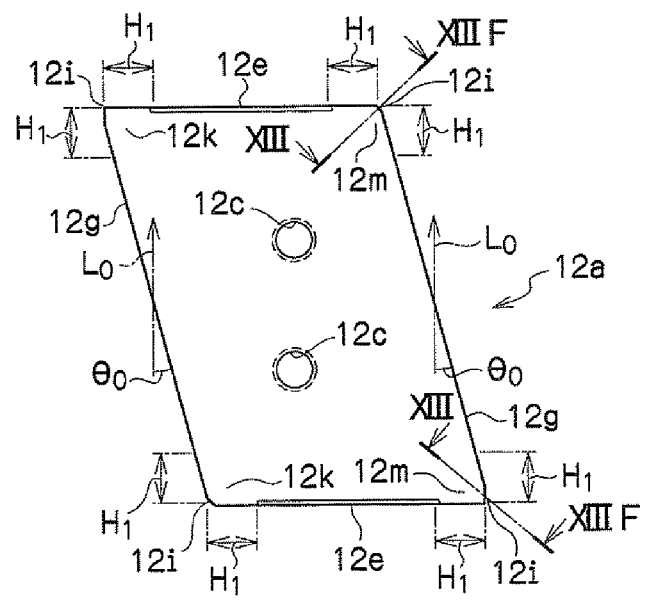
FIG. 13A is an outline plan view of a contact strip piece of a contact strip of a current collecting apparatus according to a second embodiment of the present invention.
Figure 13B:
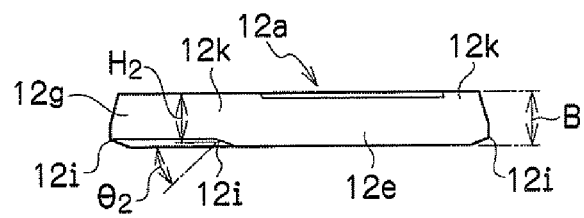
FIG. 13B is an outline front view of the contact strip piece of the contact strip of the current collecting apparatus according to the second embodiment of the present invention.
Figure 13C:
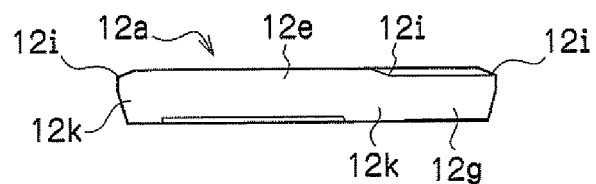
FIG. 13C is an outline rear view of the contact strip piece of the contact strip of the current collecting apparatus according to the second embodiment of the present invention.
Figure 13D:
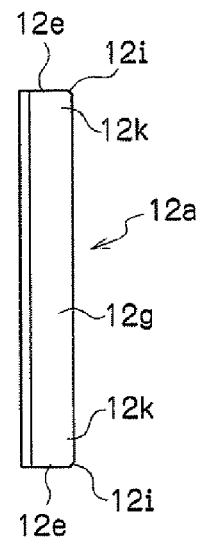
FIG. 13D is an outline right side view of the contact strip piece of the contact strip of the current collecting apparatus according to the second embodiment of the present invention.
Figure 13E:
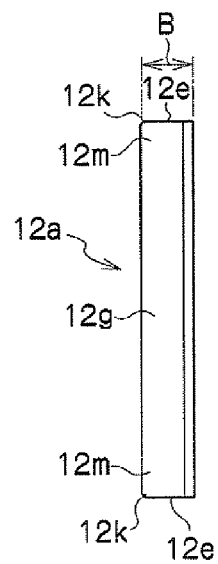
FIG. 13E is an outline left side view of the contact strip piece of the contact strip of the current collecting apparatus according to the second embodiment of the present invention.
Figure 13F:
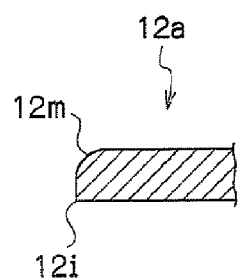
FIG. 13F is a cross-sectional view taken along line XIII-XIIIF of FIG. 13A.
Figure 14A:
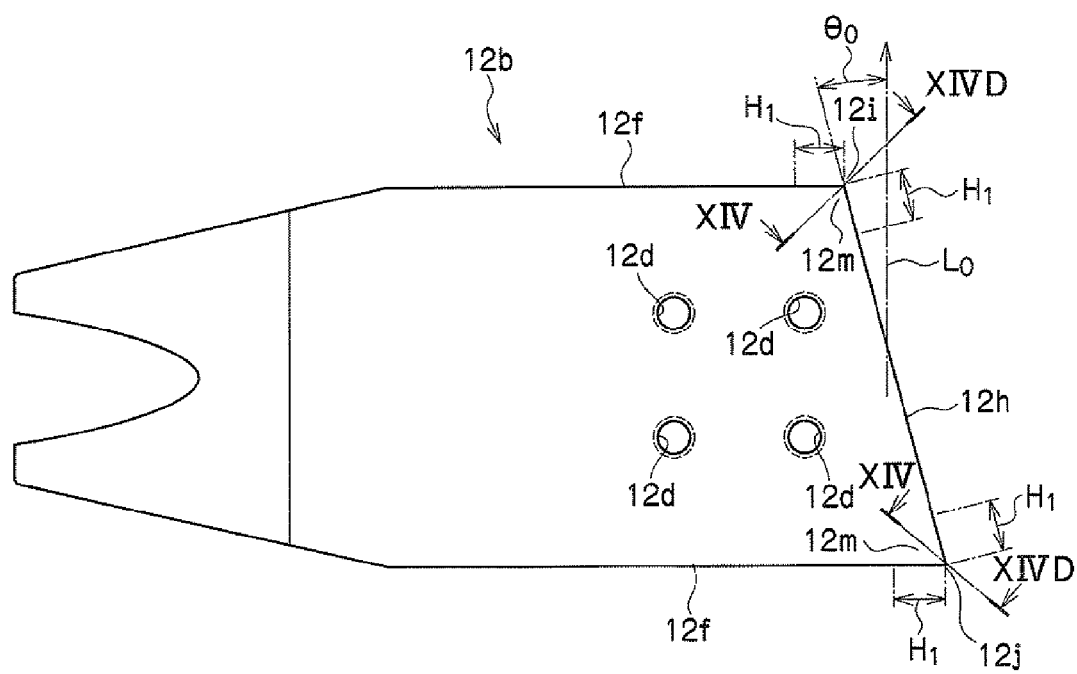
FIG. 14A is an outline plan view of the contact strip piece of the contact strip of the current collecting apparatus according to the second embodiment of the present invention.
Figure 14B:
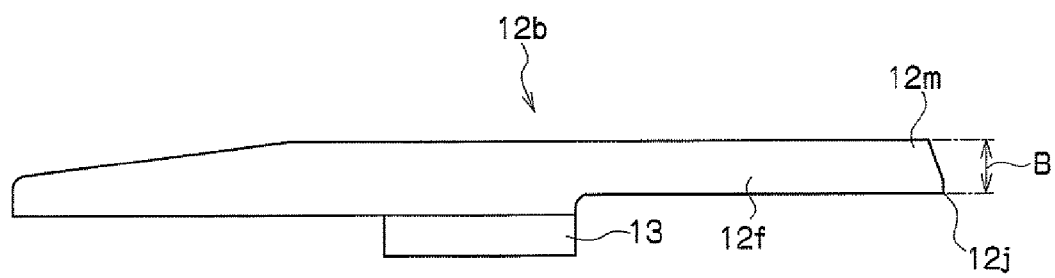
FIG. 14B is an outline front view of the contact strip piece of the contact strip of the current collecting apparatus according to the second embodiment of the present invention.
Figure 14C:
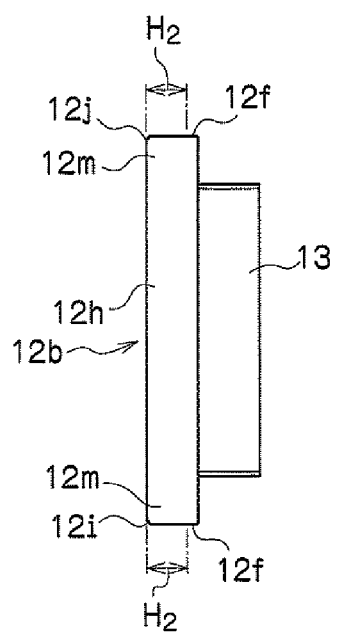
FIG. 14C is an outline right side view of the contact strip piece of the contact strip of the current collecting apparatus according to the second embodiment of the present invention.
Figure 14D:
FIG. 14D is a cross-sectional view taken along line XIV-XIVD of FIG. 14A.
Figure 15:
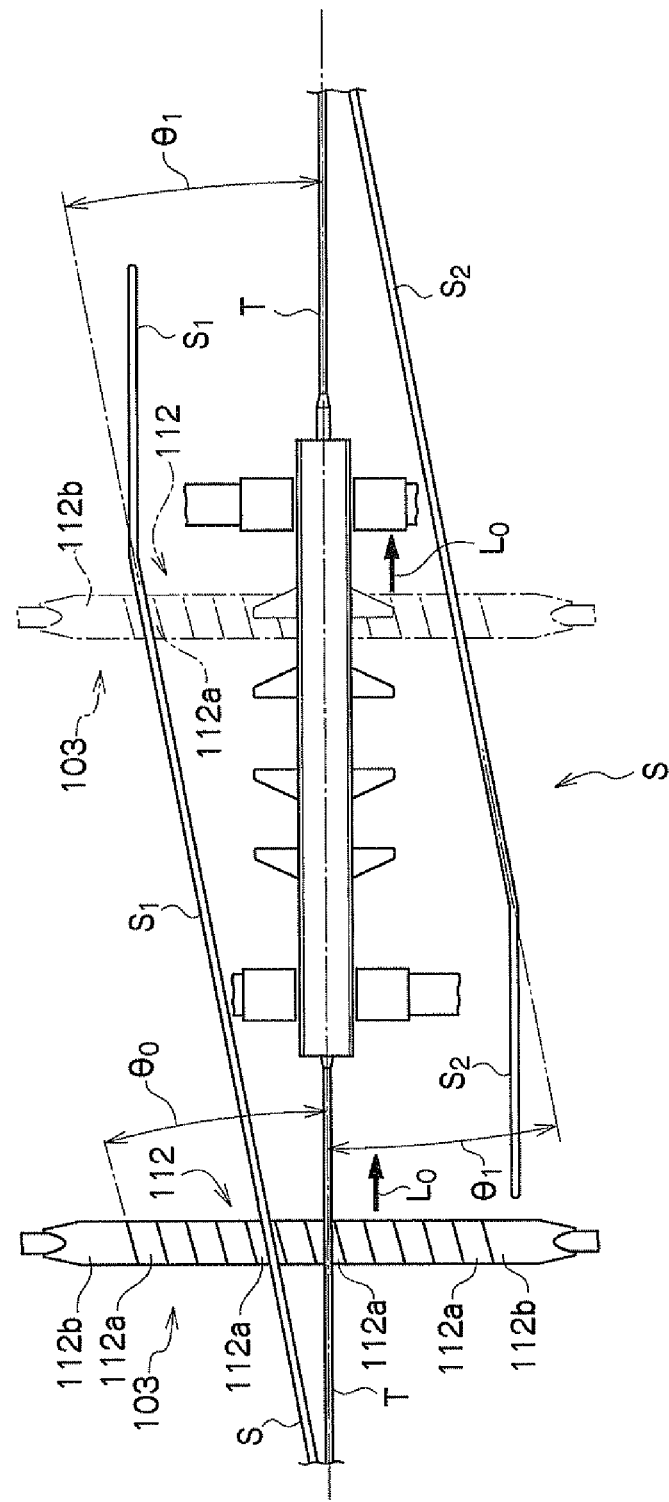
FIG. 15 is a plan view schematically showing a state in which a contact strip of a current collecting apparatus of the related art passes through an alternating current in-phase section.
Figure 16A:
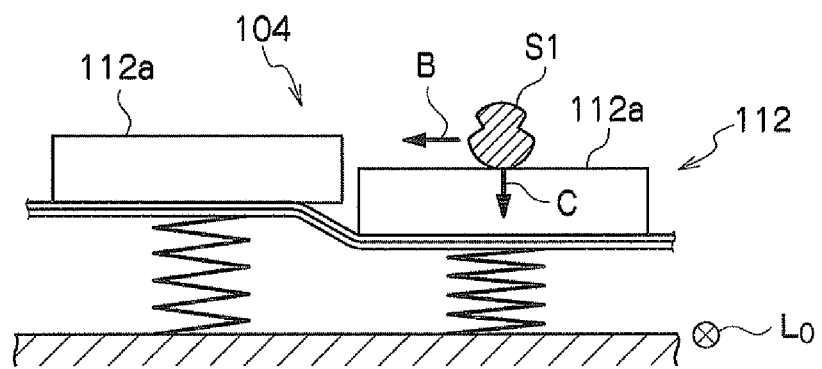
FIG. 16A is a front view showing a state of a slider and the contact strip when the contact strip of the current collecting apparatus of the related art passes through the alternating current in-phase section, when seen from a rear side in a traveling direction of the contact strip.
Figure 16B:
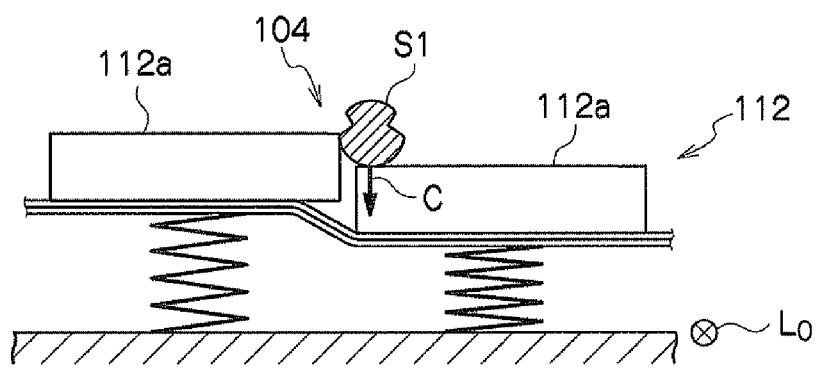
FIG. 16B is a front view showing a state of the slider and the contact strip when the contact strip of the current collecting apparatus of the related art passes through the alternating current in-phase section, when seen from the rear side in the traveling direction of the contact strip.

As shown in FIG. 2, when the vehicle 1 travels in the traveling direction $L_0$ and the contact strip 12 enters from an inlet side to an outlet side of the sectioning point S, as shown in FIG. 12A, the contact force C is applied between the contact strip piece 12*a* and the slider $S_1$. Then, the resilient part 14 and the conductive part 15 are bent with the contact strip piece 12*a* against the resilient force of the resilient support part 25. Then, the contact strip piece 12*a* to which the contact force C is applied is displaced under the contact strip piece 12*a* adjacent to the contact strip piece 12*a*. For this reason, a difference in elevation occurs between the contact strip piece 12*a* to which the contact force C is applied and the contact strip piece 12*a* adjacent to that contact strip piece 12*a*. Then, a stepped section is formed between the contact strip piece 12*a* to which the contact force C is applied and the contact strip piece 12*a* adjacent to that contact strip piece 12*a*. As shown in FIG. 2, when the contact strip 12 further enters from the inlet side of the sectioning point S, the slider $S_1$ is displaced in the longitudinal direction (an $L_1$ direction of the drawing) of the contact strip 12 as shown in FIG. 12B. For this reason, the slider $S_1$ is disposed at the stepped section between the neighboring contact strip pieces 12a. Then, the inclined surfaces of the impact mitigating parts 12k of the neighboring contact strip pieces 12a come in contact with the side surfaces of the slider $S_1$. As shown in FIG. 2, when the contact strip 12 further enters forward from the inlet side of the sectioning point S, the slider $S_1$ is further displaced in the $L_1$ direction as shown in FIG. 12C. Here, as shown in FIGS. 12B and 12C, the slider $S_1$ slightly moves in the $L_1$ direction in a state in which both side surfaces of the slider $S_1$ come in contact with the inclined surface of the impact mitigating part 12k of the neighboring contact strip piece 12a. For this reason, the inclined surface of the impact mitigating part 12k of the contact strip piece 12a at a side that the slider $S_1$ approaches (a left side in the drawing) slides relatively downward with respect to one side surface (a left side surface) of the slider $S_1$. In addition, the inclined surface of the impact mitigating part 12k of the contact strip piece 12a at a side from which the slider $S_1$ moves away (a right side in the drawing) slides relatively upward with respect to the other side surface (a right side surface in the drawing) of the slider $S_1$. As a result, as shown in FIG. 12D, an impact generated between the contact strip piece 12a and the slider $S_1$ is mitigated by the impact mitigating part 12k without fitting the slider $S_1$ into the stepped section between the neighboring contact strip pieces 12a. For this reason, the slider $S_1$ smoothly transfers from the one contact strip piece 12a of the neighboring contact strip pieces 12a to the other contact strip piece 12a. Similarly, even between the neighboring contact strip pieces 12a and 12b shown in FIGS. 3, 4A and 4B, the impact generated between the contact strip piece 12b and the slider $S_1$ is mitigated by the impact mitigating part 12m shown in FIGS. 10A to 10C without fitting the slider $S_1$ into the stepped section between the neighboring contact strip pieces 12a and 12b. For this reason, the slider $S_1$ is smoothly transferred from the contact strip piece 12a to the contact strip piece 12b.

Even when the contact strip 12 approaches the outlet side of the sectioning point S shown in FIG. 2, the impact generated between the contact strip pieces 12a and 12b and the slider $S_2$ is mitigated by the impact mitigating parts 12k and 12m without fitting the slider $S_2$ into the stepped section between the neighboring contact strip pieces 12a and 12b. For this reason, the slider $S_2$ is smoothly transferred from the neighboring contact strip piece 12b to the contact strip piece 12a. Further, the slider $S_2$ is smoothly transferred from the one contact strip piece 12a of the neighboring contact strip pieces 12a to the other contact strip piece 12a. As shown in FIGS. 11A to 11D, even when the contact strip pieces 12a and 12b are abraded and arrive at a use limit of a residual amount $\Delta_2$, chamfered sections of the impact mitigating parts 12k and 12m remain. For this reason, the contact strip pieces 12a and 12b maintain a function of mitigating an impact until an exchange time comes.

The impact mitigating structure of the contact strip piece according to the first embodiment of the present invention provides effects as described below.

(1) In the first embodiment of the present invention, an impact generated between the neighboring contact strip pieces 12a when the contact strip piece 12a collides with the slider $S_1$ and $S_2$ is mitigated by the impact mitigating part 12k. In addition, in the first embodiment of the present invention, the impact generated between the neighboring contact strip pieces 12a and 12b when the contact strip piece 12b collides with the slider $S_1$ and $S_2$ is prevented by the impact mitigating part 12m. For this reason, for example, when the contact strip 12 passes through the sectioning point S, the sliders $S_1$ and $S_2$ are fitted into the stepped section between the neighboring contact strip pieces 12a and the stepped section between the neighboring contact strip pieces 12a and 12b, the contact strip pieces 12a and 12b interfere with the slider $S_1$ and $S_2$, and the impact generated between the contact strip pieces 12a and 12b and the sliders $S_1$ and $S_2$ is reduced by the impact mitigating parts 12k and 12m.

(2) In the first embodiment of the present invention, the impact mitigating parts 12k and 12m remain until the contact strip pieces 12a and 12b arrive at a predetermined abrasion loss. For this reason, the impact generated between the contact strip pieces 12a and 12b and the sliders $S_1$ and $S_2$ can be securely mitigated until the contact strip pieces 12a and 12b arrive at a prescribed abrasion limit and the exchange time comes.

(3) In the first embodiment of the present invention, the impact mitigating parts 12k and 12m are formed at the corners 12i and 12j of the contact strip pieces 12a and 12b. For this reason, the interference between the contact strip pieces 12a and 12b and the sliders $S_1$ and $S_2$ can be easily prevented by only improving portions of the contact strip pieces 12a and 12b without largely modifying shapes of the contact strip pieces 12a and 12b.

(4) In the first embodiment of the present invention, the impact mitigating parts 12k and 12m are chamfered sections formed at the corners 12i and 12j of the contact strip pieces 12a and 12b. For this reason, the interference between the contact strip pieces 12a and 12b and the sliders $S_1$ and $S_2$ can be easily prevented through simple processing.

Second Embodiment

Hereinafter, the same elements as the elements shown in FIGS. 1A to 13F are designated by the same reference numerals and detailed description thereof will be omitted. The impact mitigating parts 12k and 12m shown in FIGS. 13A to 13F and 14A to 14D are rounded sections formed at the corners 12i and 12j of the contact strip pieces 12a and 12b. The corners 12i and 12j of the impact mitigating parts 12k and 12m are formed by mechanical processing such as cutting or sintering by a forming die. The impact mitigating parts 12k and 12m have quarter-circular cross sections, and are formed to have surfaces curved at a predetermined radius. In the second embodiment of the present invention, the same effects as the first embodiment can be accomplished.

Other Embodiments

The present invention is not limited to the above-mentioned embodiments but may be variously varied or modified as follows.

(1) In the embodiment of the present invention, the case in which the current collecting apparatus 3 is moved in the flap direction (the traveling direction $L_0$) in which the contact strip 12 is disposed at a rear side in the traveling direction with respect to the framework 6 has been exemplarily described. However, the present invention can also be applied to the case in which the current collecting apparatus 3 is moved in a counter-flap direction (a reverse direction of the traveling direction $L_0$) in which the contact strip 12 is disposed at a front side in the traveling direction with respect to the framework 6. In addition, in the embodiment of the present invention, the case in which the current collecting apparatus 3 is a single arm type pantograph has been exemplarily described. However, the present invention can also be applied to another type of pantograph such as a rhombic type pantograph, a wing type pantograph, or the like. Further, in the embodiment of the present invention, the contact strip 12 constituted by twelve contact strip pieces 12a and two contact strip pieces 12b has been exemplarily described. However, the number of contact strip pieces 12a and 12b is not limited thereto.

(2) In the embodiment of the present invention, the sliders $S_1$ and $S_2$ have been exemplarily described as electric-car lines sliding with the contact strip 12. However, the present invention can also be applied to another electric-car line material such as an electric-car line metal fitting or the like. In addition, in the embodiment of the present invention, the example in which the contact strip 12 enters from the slider $S_1$ toward the slider $S_2$ has been described. However, the present invention can also be applied to the case in which the contact strip 12 enters from the slider $S_2$ toward the slider $S_1$ in a reverse direction. Further, the case in which the present invention is applied to the contact strip pieces 12a and 12b of the multi-segmentation contact strip shoe body used in the embodiment of the present invention and the pantograph shoe body for the Shinkansen (trademark) has been described. However, the present invention can be applied to the contact strip piece even when the multi-segmentation contact strip shoe body is used in the pantograph shoe body for a conventional line.

(3) In the embodiment of the present invention, the example in which the sectioning point S is an insulator type section (A type section) in which one slider $S_1$ moves away from one side surface of the trolley wire T and one slider $S_2$ approaches the other side surface of the trolley wire has been exemplarily described. However, the present invention can be applied to another type of sectioning point. For example, the present invention can also be applied to an insulator type section (a B type section), an FRP type in-phase section, or the like, in which one slider $S_1$ moves away leftward and rightward from both side surfaces of the trolley wire T and one slider $S_2$ approaches both side surfaces of the trolley wire leftward and rightward. In addition, in the embodiment of the present invention, while the case in which the impact generated between the sliders $S_1$ and $S_2$ and the contact strip pieces 12a and 12b when the contact strip 12 passes through the sectioning point S is mitigated has been described, the present invention is not limited thereto. For example, the present invention can also mitigate an impact which may be generated between the trolley wire T and the contact strip pieces 12a and 12b when passing through the trolley wires T crossing each other at a branch of a railroad.

INDUSTRIAL APPLICABILITY

According to the impact mitigating structure of the contact strip piece according to the present invention, the impact generated when the contact strip piece collides with the electric-car line can be easily mitigated through simple processing.

DESCRIPTION OF REFERENCE NUMERALS 3 current collecting apparatus
8 collector shoe
12 contact strip
12a, 12b contact strip piece
12e, 12f end surface section
12g, 12h side surface section
12i, 12j corner
12k, 12m impact mitigating part
L overhead line (electric-car line)
T trolley wire
S sectioning point
$S_1$ and $S_2$ slider (electric-car line)
$\theta_0$ to $\theta_3$ inclination angle
$L_0$ traveling direction
C contact force
$\Delta_1$ interval
$\Delta_2$ residual amount

The invention claimed is:

1. An impact mitigating structure of a contact strip piece for mitigating an impact generated at a plurality of contact strip pieces formed by dividing a contact strip sliding with an electric-car line in a longitudinal direction, the impact mitigating structure of the contact strip piece comprising:
   an impact mitigating part configured to mitigate the impact generated when the contact strip piece collides with the electric-car line between the neighboring contact strip pieces,
   wherein the contact strip pieces comprise:
      an upper surface which slides with the electric-car line,
      an end surface section which is formed at a front side and a rear side in a traveling direction of the contact strip piece, and which has a flat surface perpendicularly intersecting the upper surface; and
      a side surface section which is formed at a side at which the contact strip pieces are adjacent to each other, and which has a flat surface perpendicularly intersecting the upper surface, and
   wherein the impact mitigating part is formed to have a surface at a corner of intersection, the surface facing a direction crossing a direction to which the end surface section faces and a direction to which the side surface section faces and being formed to have a larger area as being nearer to the upper surface.

2. The impact mitigating structure of the contact strip piece according to claim 1, wherein the impact mitigating part remains until the contact strip piece arrives at a predetermined abrasion loss.

3. The impact mitigating structure of the contact strip piece according to claim 2, wherein the impact mitigating part is a chamfered section formed at the corner of the contact strip piece.

4. The impact mitigating structure of the contact strip piece according to claim 2, wherein the impact mitigating part is a rounded section formed at the corner of the contact strip piece.

5. The impact mitigating structure of the contact strip piece according to claim 1, wherein the impact mitigating part is a chamfered section formed at the corner of the contact strip piece.

6. The impact mitigating structure of the contact strip piece according to claim 1, wherein the impact mitigating part is a rounded section formed at the corner of the contact strip piece.

* * * * *